(12) United States Patent
Gandolfo

(10) Patent No.: US 12,447,901 B2
(45) Date of Patent: Oct. 21, 2025

(54) TRUNK SHELF SYSTEM

(71) Applicant: Alexandra Castiello Gandolfo, Bethesda, MD (US)

(72) Inventor: Alexandra Castiello Gandolfo, Bethesda, MD (US)

( * ) Notice: Subject to any disclaimer, the term of this patent is extended or adjusted under 35 U.S.C. 154(b) by 213 days.

(21) Appl. No.: 18/213,349

(22) Filed: Jun. 23, 2023

(65) Prior Publication Data

US 2024/0001855 A1    Jan. 4, 2024

Related U.S. Application Data

(60) Provisional application No. 63/445,043, filed on Feb. 13, 2023, provisional application No. 63/356,734, filed on Jun. 29, 2022.

(51) Int. Cl.
*B60R 5/04*      (2006.01)

(52) U.S. Cl.
CPC .............. *B60R 5/044* (2013.01); *B60R 5/045* (2013.01)

(58) Field of Classification Search
CPC ................................ B60R 5/044; B60R 5/045
USPC ........................................ 297/188.06; 108/44
See application file for complete search history.

(56) References Cited

U.S. PATENT DOCUMENTS

| | | | |
|---|---|---|---|
| 2,645,392 A | 7/1953 | Gottsegen et al. | |
| 2,774,640 A | 12/1956 | Harmon | |
| 2,881,039 A | 4/1959 | Guzman | |
| 3,386,392 A | 6/1968 | Gramm | |
| 3,393,936 A | 7/1968 | Hall | |
| 3,756,481 A | 9/1973 | Schaefer | |
| 3,951,486 A | 4/1976 | Tracy | |
| 4,466,659 A | 8/1984 | Carpentier et al. | |
| 5,046,433 A | 9/1991 | Kramer et al. | |
| D344,625 S * | 3/1994 | Berry | D12/416 |
| 5,366,124 A | 11/1994 | Dearborn, IV | |
| 5,667,115 A | 9/1997 | Verhaeg | |
| 5,685,592 A | 11/1997 | Heinz | |
| 5,931,527 A | 8/1999 | D'Onofrio et al. | |
| 6,050,202 A * | 4/2000 | Thompson | B60R 5/045 296/37.16 |
| 6,092,708 A | 7/2000 | Rand | |

(Continued)

FOREIGN PATENT DOCUMENTS

| | | |
|---|---|---|
| CN | 104723977 A | 6/2015 |
| DE | 102006061843 A1 | 6/2008 |
| WO | WO 03/026916 A2 | 4/2003 |

OTHER PUBLICATIONS

Amazon, https://www.amazon.com/Backseat-Trunk-Organizer-SUV-Car/dp/B07MLH738V/ref, downloaded Oct. 27, 2020, 11 pages, date unknown.

(Continued)

*Primary Examiner* — Justin M Larson
(74) *Attorney, Agent, or Firm* — Nixon & Vanderhye P.C.

(57) ABSTRACT

A trunk shelf system for mounting onto a seat back of a vehicle includes a support structure configured to be secured to the seat back. The support structure includes a first pair of connection pins and a second pair of connection pins spaced apart from the first pair of connection pins. The trunk shelf system further includes a shelf movably mounted to the support structure via one of the first pair of connection pins and the second pair of connection pins. The shelf has a bottom surface providing a primary support surface.

21 Claims, 16 Drawing Sheets

(56) References Cited

U.S. PATENT DOCUMENTS

| | | | |
|---|---|---|---|
| 6,105,839 | A | 8/2000 | Bell |
| 6,405,909 | B1 | 6/2002 | Burnett et al. |
| 6,607,241 | B2 | 8/2003 | Johnston |
| 6,874,667 | B2 | 4/2005 | Dykstra et al. |
| 7,350,681 | B2 | 4/2008 | Polburn et al. |
| 7,658,153 | B1 | 2/2010 | Patoka |
| 7,708,329 | B2 | 5/2010 | Duller |
| 7,806,453 | B2 | 10/2010 | Aebker |
| 8,814,245 | B1 | 8/2014 | Welch et al. |
| 8,876,184 | B2 | 11/2014 | Lucas |
| 10,239,460 | B2 | 3/2019 | Hotio |
| 10,300,861 | B1 | 5/2019 | Green et al. |
| 10,336,261 | B2 | 7/2019 | White et al. |
| 10,899,284 | B2 * | 1/2021 | Descoteaux ............ B60R 11/06 |
| 11,858,466 | B2 * | 1/2024 | Gandolfo ................ B60R 7/043 |
| 2003/0057747 | A1 * | 3/2003 | Johnston ................ B60N 3/004 |
| | | | 297/188.06 |
| 2004/0262345 | A1 * | 12/2004 | Polburn .................. B60R 7/005 |
| | | | 224/282 |
| 2005/0134075 | A1 | 6/2005 | Kim |
| 2005/0218172 | A1 | 10/2005 | Hassett |
| 2010/0275818 | A1 | 11/2010 | Ellis |
| 2011/0215122 | A1 | 9/2011 | Osborne |
| 2016/0288723 | A1 | 10/2016 | Woodhouse et al. |
| 2017/0303701 | A1 | 10/2017 | Degon |
| 2019/0029217 | A1 | 1/2019 | Ryan |
| 2021/0155163 | A1 | 5/2021 | Gandolfo |

OTHER PUBLICATIONS

Amazon, https://www.amazon.com/Organizer-Organizers-Collapsible-Accessories-Organize/dp/B07NQ6JHN5?source=ps-sl-shoppingads-lpcontext&psc=1, downloaded Oct. 27, 2020, 8 pages, date unknown.

Amazon, AMEIQ Car Trunk Organizer, Elastic Cargo Nets Bag, Seat Back Mesh Storage, Hanging Netting Holder for Toys Tools Cloth Groceries, Fit for Most SUVs, downloaded Oct. 27, 2020, 8 pages, date unknown.

Amazon, YOUMILE Car Trunk Organizer Storage for SUV, Collapsible Cargo Storage, Portable Multi Compartments Trunk Organizer with Securing Straps and Net, Black, downloaded Oct. 27, 2020, 8 pages, date unknown.

Amazon, Home Innovation Trunk Organizer for SUV Car, Truck, Auto, Minivan—4 Adjustable Compartments Foldable Portable Trunk Organizer, Heavy Duty Durable Car Organizer, Removable Flexible Cargo Storage Bag, downloaded Oct. 27, 2020, 10 pages, date unknown.

Walmart.com, Best Choice Products 60x20in Folding Cargo Carrier Basket Rack for Car, Truck, Trailer w/ 2in Receiver, Steel Frame, downloaded Oct. 27, 2020, 4 pages, date unknown.

Amazon, Lebogner Back Seat Trunk Organizer, 5 Pocket Space Saving Car Organizer, Auto Trunk Organizer, Backseat Hanging Storage Organizer, Multipurpose Cargo Accessories Under Seat Organizer, Adjustable Strap, downloaded Oct. 27, 2020, 10 pages, date unknown.

Macy's, J.L. Childress Double Cargo Double Stroller Organizer, downloaded Oct. 27, 2020, 1 page, date unknown.

Amazon, Fortem Car Trunk Organizer, Foldable Cover, Non-Slip Waterproof Bottom, Straps, Cargo Storage (2 Compartments, Black), downloaded Oct. 27, 2020, 11 pages, date unknown.

Amazon, SUAOKI Backseat Car Trunk Organizer Foldable Cargo Storage Bag with Adjustable Strap, Durable Cover, Washable, Best for SUV, Vehicle, Auto, Minivan(Black), downloaded Oct. 27, 2020, 8 pages, date unknown.

Written Opinion and International Search Report mailed Oct. 3, 2023 in related International Application No. PCT/US23/68928, 21 pages.

* cited by examiner

TRUNK SHELF SYSTEM

CROSS-REFERENCE TO RELATED APPLICATIONS

This application claims the benefit of priority to U.S. Application No. 63/356,734, filed Jun. 29, 2022 and U.S. Application No. 63/445,043, filed Feb. 13, 2023, the entire contents of each of which are hereby incorporated by reference.

BACKGROUND & SUMMARY

The present technology relates generally to a stowable trunk shelf system for an automobile, such as a sports utility vehicle (SUV) and/or a cross over vehicle (CUV).

Currently there are a number of solutions for SUV and CUV cargo space organization. Some of these solutions attempt to compartmentalize or subdivide an SUV or CUV's cargo space but these solutions fail to meet the needs of the industry.

One aspect of the present technology is a repositionable shelf for an SUV or CUV trunk that allows users to take advantage of the height of the cargo space from the base of the trunk to the bottom of the rearmost head restraints.

Another aspect of the present technology is to have a restraining bar that runs around the perimeter of the shelf that keeps items placed on top of the shelf from falling over in transit.

Another aspect of the present technology is for the restraining bar to extend upward in height via telescoping rods. Once extended, the retraining bar locks firmly into place.

Another aspect of the present technology is to have a cargo netting enclosure on top of the shelf that hooks into the retraining bar that keeps items placed on top of the shelf from falling over in transit.

Yet another aspect of the present technology is to have vertical dividers on the shelf that sub-divide the shelf length and allow users to keep smaller items (such as grocery bags) firmly in place in transit. These dividers can fold down/collapse onto the base of the shelf or they can detach entirely so that the user can subdivide the length of the shelf as necessary.

Yet another aspect of the present technology is to enable the trunk shelf to collapse or stow while not in use.

Another aspect of the present technology is directed to an angle adjuster that allows users to adjust the angle of the trunk shelf, because not all seatbacks are positioned at the same angle relative to the trunk floor. The user sets the angle at which the shelf meets the seatback via the angle adjuster, e.g., pin and slot mechanism and/or bearing mechanism.

Another aspect of the present technology is a built-in level that shows users when the shelf is at the desired angle with the specific seat backs. This helps the user set the angle for the shelf based on the precise angle of his or her seatback and provides for horizontal positioning of the shelf.

Another aspect of the present technology is to allow the user to set the angle of the shelf via an angle adjuster that need only be set one time for any particular vehicle (e.g., "set and forget").

Another aspect of the present technology is that it installs quickly and easily via an adjustable belt system that loops around the seatback itself and/or at least one of the seatback headrests. No tools or hardware are needed to install this technology into an SUV or CUV.

Another aspect of the present technology is that it installs on almost any SUV or CUV; it is nearly universal in its fit.

Another aspect of the present technology is detachable and collapsible telescoping legs. The legs will provide additional structural support when very heavy items are placed on the shelf.

One aspect of the present disclosure is directed to a trunk shelf system comprising a movable shelf, a support structure, or hard plastic backing that rests against the back of the seat on which it is installed, and at least one angle adjuster to set the angle of the shelf relative to the support structure.

The trunk shelf system may include a restraining bar that runs along the sides and front of the shelf and is extendable in height, a detachable sturdy cargo netting that extends over top of the shelf and hooks onto the restraining bar, collapsible or detachable horizontal shelf dividers that sit on top of the shelf for subdivision of the shelf's length, and/or a sturdy belt system, including at least one belt, that attaches the shelf to the rearmost seatback headrests and/or seatback itself. This belt system allows users to install the trunk shelf system with no tools or hardware.

The trunk shelf system also may also feature a set of detachable and collapsible legs that are height adjustable. When in use, the legs extend and meet the floor of the trunk to offer additional structural support for the repositionable shelf.

The trunk shelf system may be stowed while not in use. That is, the multi angle folding links or hinges holding the shelf in an upright position collapse or fold so that the shelf can stow and lay flat against the back of the seatback while not in use.

The device may also have one or more of the following:
  Customizable "skin," cover, or design for the underside of the shelf with user's monogram, college or pro team logo, company name, etc. When stowed, the shelf would prominently display this logo or design. This same customizable skin or cover can be placed on the top of the shelf, too. When the detachable track system is in place to allow the shelf to move forward to the opening of the trunk, the top of the shelf's design or logo would be prominently displayed.
  A holder or receptacle for storing umbrellas that hooks onto the shelf;
  Pockets made of mesh or other lightweight material that attach to either of the shelf's sides to offer additional storage space;
  Pockets made of mesh or other lightweight material that attach to the front of the shelf to offer additional storage space;
  Cooler that hooks on to the top or onto the bottom of the shelf for storing cold items such as perishable groceries, water, etc.;
  Detachable or collapsible horizontal dividers that hook onto the bottom of shelf to offer sub-division of space underneath the shelf;
  Hooks that attach anywhere along the perimeter of the shelf restraining bar to offer hanging capability;
  Cup holders that attach to the front edge of the trunk shelf.

An aspect of the present technology is directed to a trunk shelf system for mounting onto a seat back of a vehicle, the system comprising a support structure configured to be secured to the seat back; and a shelf movably mounted to the support structure, the shelf being movable between a stowed position and a deployed position, the shelf having a bottom surface providing a support surface.

Another aspect of the present technology is directed to trunk shelf system for mounting onto a seat back on a vehicle, the system comprising a support structure configured to be secured to the seat back; a shelf movably mounted to the support structure and being movable between a stowed position and a deployed position; and the shelf connectable to different locations on the support structure in order to change a height of the shelf relative to a floor of the vehicle.

The disclosed systems may provide for subdivision of the height of an SUV or CUV's cargo space. The shelf provides a large surface where users can place and store items securely above the trunk's floor, freeing up floor space for larger items such as strollers, coolers, and folding chairs. Further, the trunk shelf system offers a substantially universal fit; the device is installed onto the seatback of an SUV or CUV trunk via an intuitive system, e.g., one or more belts that requires no tools or hardware. This system is sturdy and secure, providing for one or more, e.g., three, separate attachment points of the shelf to almost any SUV or CUV. In examples, the system is unique due to the presence of one or more of the following: (1) a repositionable shelf that attaches via a belt system to an SUV or CUV's rear seatback head restraints; (2) one or more adjustable angle folding hinges or links to accommodate almost any angle of rear seatback to which the shelf is attached allowing the shelf to open and lay flat; (3) ability to collapse or stow the shelf against the seat on which it's installed when not in use; (4) sturdy cargo netting that attaches to the restraining bar that runs along the perimeter of the repositionable shelf and extends over top of the shelf; and/or (5) horizontal shelf divider functionality on the shelf to allow users to subdivide the horizontal space of the shelf itself if necessary (these shelf dividers can collapse down onto the floor of the shelf, retractor detach altogether).

One form of the technology is a trunk shelf system comprising a support structure and a shelf movably connected to the support structure at one of a first location and a second location.

One form of the technology is a trunk shelf system comprising a support structure configured to be secured to the seat back, the support structure including a at least a first connection pin, e.g., a first pair of connection pins, and at least a second connection pin, e.g., a second pair of connection pins, spaced apart from the at least said first connection pin or the first pair of connection pins; and a shelf movably mounted to the support structure via one of the at least said first connection pin or the first pair of connection pins and the at least second connection pin of the second pair of connection pins, the shelf being movable between a stowed position and a deployed position, the shelf having a bottom surface providing a primary support surface.

In some forms, a) the support structure includes a top bar, a bottom bar, and a pair of side bars each extending between the top bar and the bottom bar, and wherein the support structure forms a closed perimeter; b) the top bar, the bottom bar, and the pair of side bars are removably connected to one another; c) the first pair of connection pins are connected to the pair of side bars between the top bar and the bottom bar; d) each connection pin of the first pair of connection pins includes a fixed end connected to one side bar of the pair of side bars and a free end projecting toward the other side bar of the pair of side bars; and/or e) the second pair of connection pins are connected between the bottom bar and one side bar of the pair of side bars.

In some forms, a) the first pair of connection pins and the second pair of connection pins have substantially the same shape; and/or the first pair of connection pins and the second pair of connection pins are at least partially cylindrical.

In some forms, a) the shelf further comprises a first clip and a second clip, and wherein the first clip and the second clip are removably connectable to one of the first pair of connecting pins and the second pair of connecting pins; and/or b) the shelf is pivotably mounted to the support structure.

In some forms, a); the shelf is movable between a stowed position and a deployed position when mounted to the support structure; b) the shelf is removably mounted to either the first pair of connection pins or the second pair of connection pins in the deployed position; c) the shelf is removably mounted to the first pair of connection pins in the stowed position; d) the shelf includes side walls with a pair of notches; and/or e) the pair of notches are configured to receive the second pair of connection pins in the stowed position.

In some forms, a) at least one strap coupled between the support structure and the shelf, wherein the at least one strap is configured to oppose a gravitational force of the shelf; and/or b) the at least one strap includes a first strap and a second strap, the first strap is connected to one side bar and an end of the shelf, the second strap is connected to the other side bar and an opposite end of the shelf.

In some forms the support structure includes a top bar, a bottom bar, and a pair of side bars each extending between the top bar and the bottom bar, and wherein the support structure forms a closed perimeter; the first pair of connection pins are connected to the pair of side bars between the top bar and the bottom bar; each connection pin of the first pair of connection pins includes a fixed end connected to one side bar of the pair of side bars and a free end projecting toward the other side bar of the pair of side bars; and the second pair of connection pins are connected between the bottom bar and one side bar of the pair of side bars.

In some forms, the first pair of connection pins and the second pair of connection pins are at least partially cylindrical; and the shelf further comprises a first clip and a second clip, and wherein the first clip and the second clip are removably connectable to one of the first pair of connecting pins and the second pair of connecting pins.

In some forms, the support structure includes a top bar, a bottom bar, and a pair of side bars each extending between the top bar and the bottom bar, and wherein the support structure forms a closed perimeter; and a first strap and a second strap, the first strap is connected to one side bar and an end of the shelf, the second strap is connected to the other side bar and an opposite end of the shelf.

Another aspect of the present technology is directed to a trunk system having a shelf and a support structure in which various elements of the system (e.g., rails of the support structure, legs, and/or straps, etc.) may be stored or packed on the bottom surface of the shelf. In this position, the system may be packaged for shipping or removed from the car seat back for storage. This may help to keep all of the elements together without requiring extra storage space.

This disclosure will now provide a more detailed and specific description that will refer to the accompanying drawings. The drawings and specific descriptions of the drawings, as well as any specific or alternative examples discussed, are intended to be read in conjunction with the entirety of this disclosure. The trunk shelf system may, however, be embodied in many different forms and should not be construed as being limited to the examples set forth herein; rather, these examples are provided by way of illustration only and so that this disclosure will be thorough, complete and fully convey understanding to those skilled in the art. Moreover, one or more features of one example may be used in conjunction with any and all of the alternate examples.

DETAILED DESCRIPTION OF EXAMPLE NON-LIMITING EXAMPLES

The present technology is directed to a trunk shelf system 100 for SUVs and CUVs. The system includes a repositionable shelf that can be selectively and repeatedly moved between one or more deployed positions (see, e.g., FIGS. 1 to 3) in which the shelf 1 is substantially horizontal and/or parallel to the trunk's floor, and a stowed position substantially parallel with the seatback when not in use (see, e.g., FIG. 11) and/or a storage position where the system 100 may be disconnected from the seatback and/or disassembled (see e.g., FIG. 12).

Figure 1:
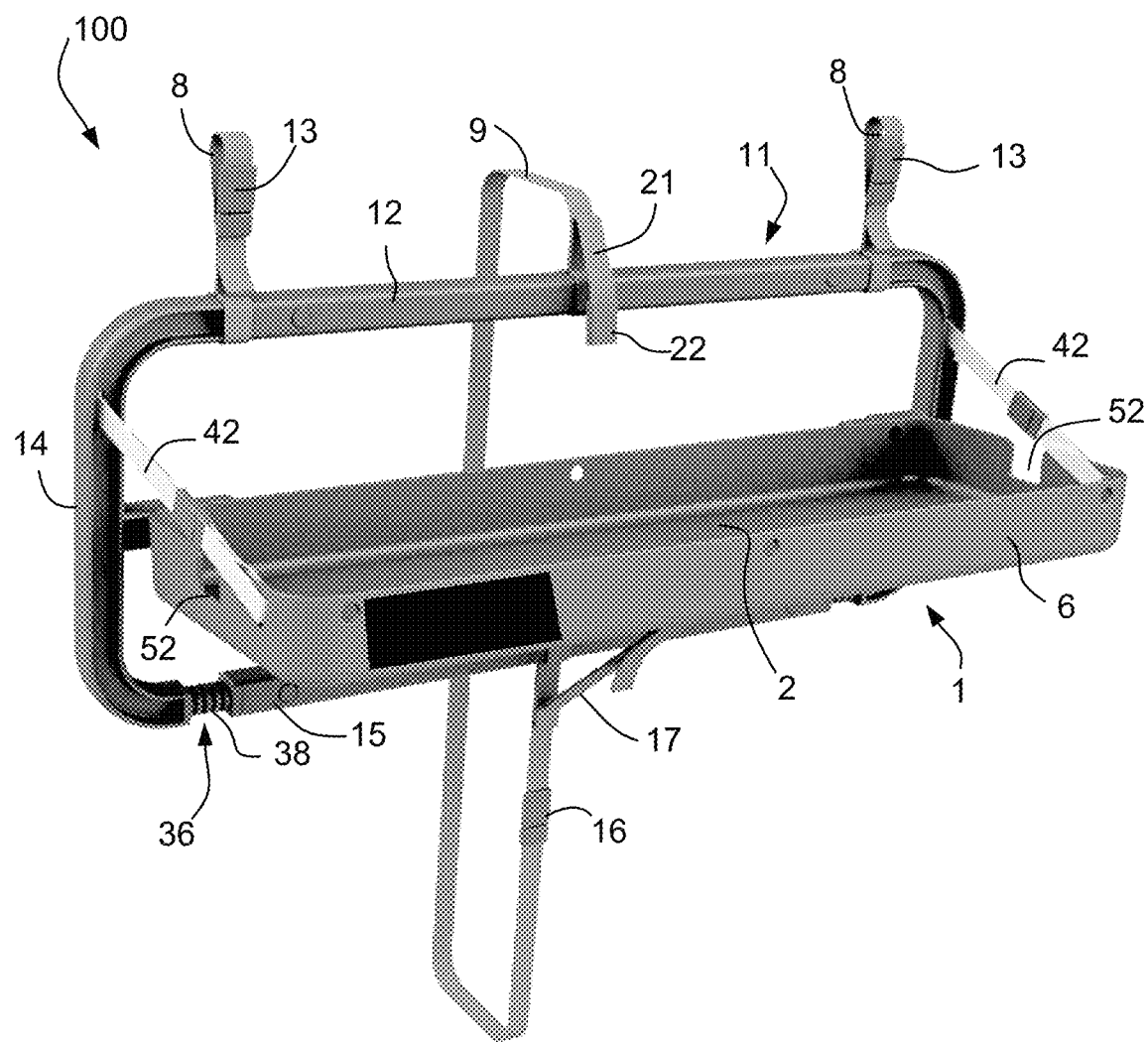
FIG. 1 is an upper perspective view of a trunk shelf system in a first in use position according to an aspect of the present technology.
Figure 2:
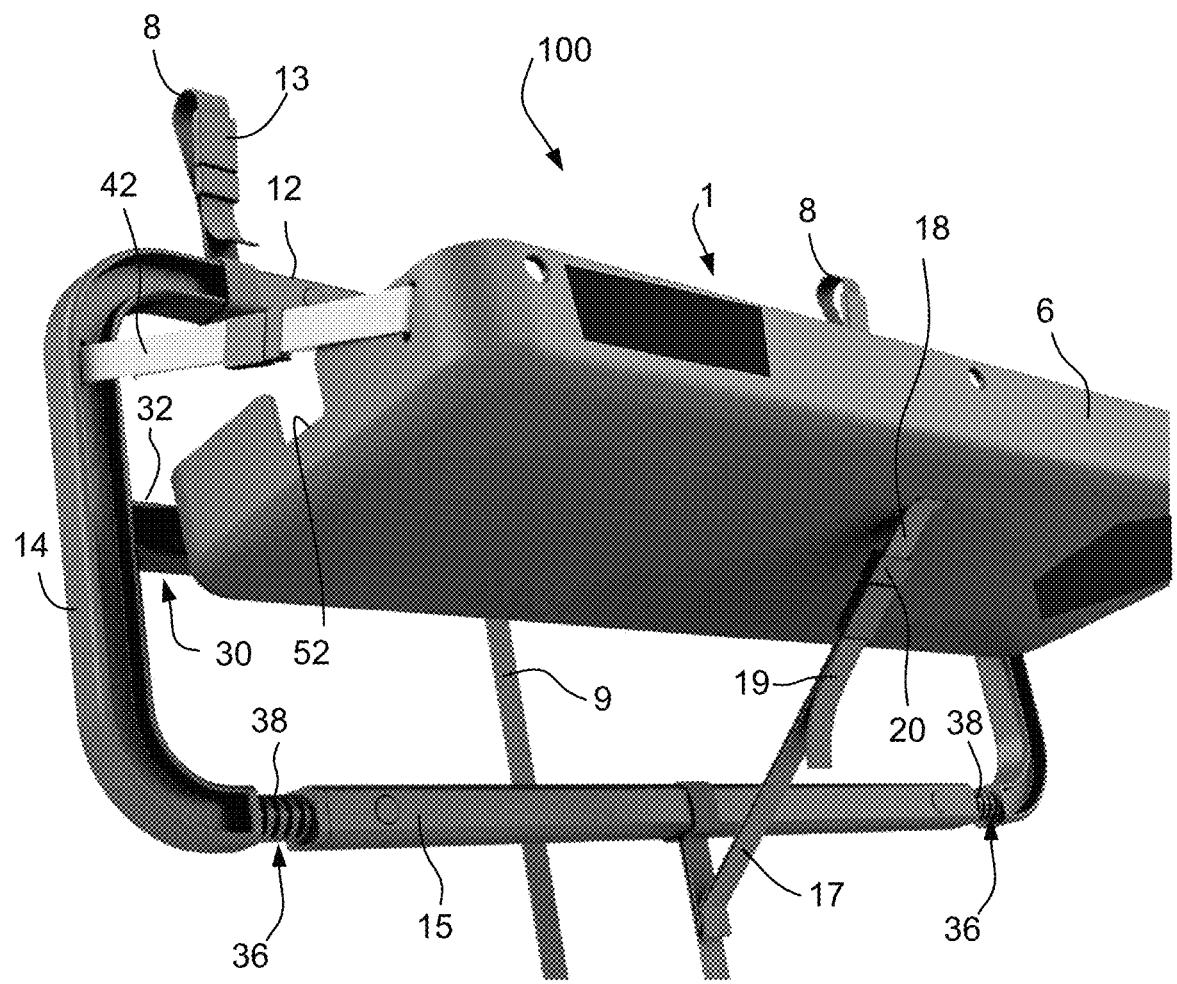
FIG. 2 is a lower perspective view of the trunk shelf system according to FIG. 1.
Figure 3:
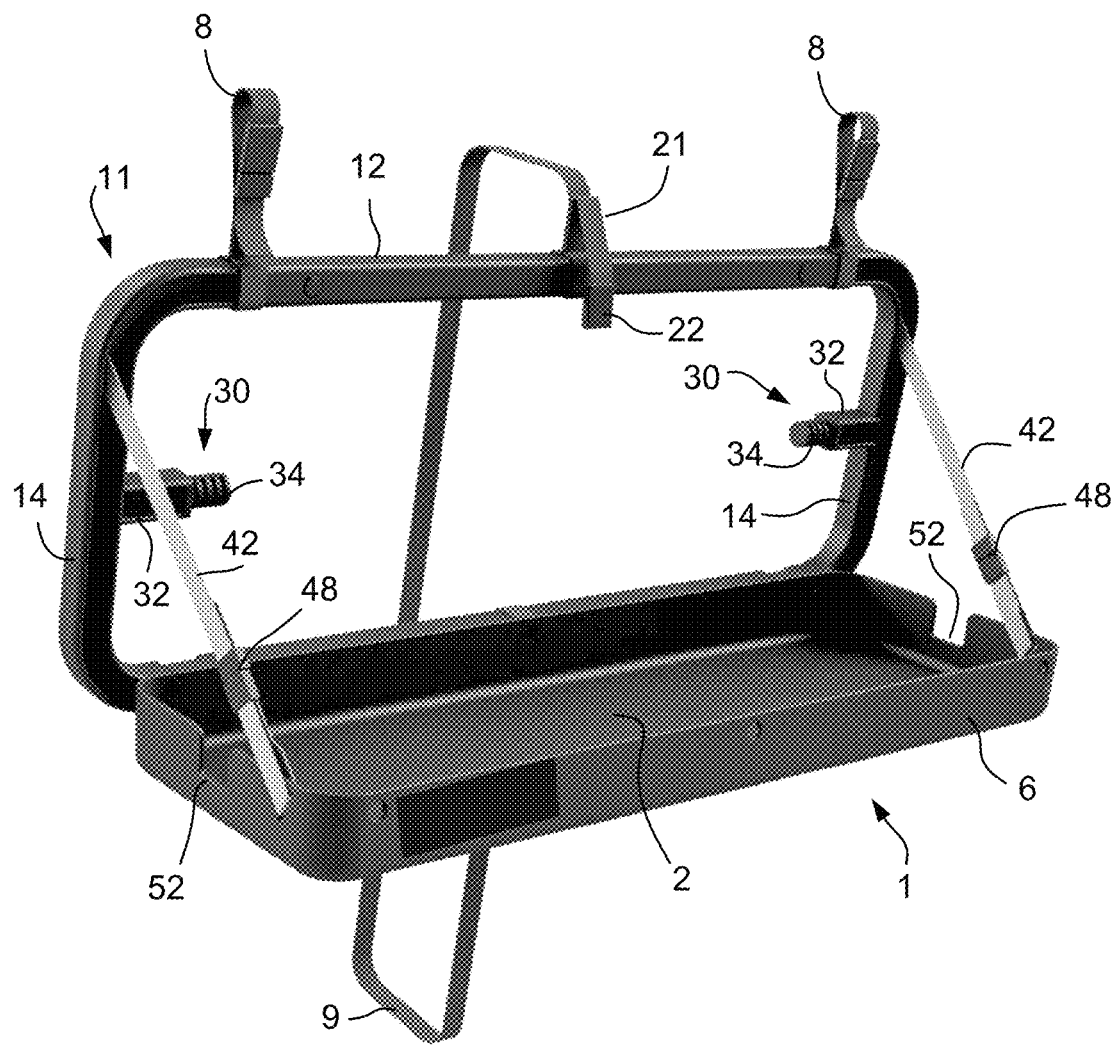
FIG. 3 is an upper perspective view of the trunk shelf system in a second in use position according to FIG. 1.

As shown in FIGS. 1 to 3, one example of the system 100 includes a shelf 1, which may be made of a substantially rigid material that is optionally reinforced. For example, the shelf 1 may be constructed from a durable hard plastic, a metal, or any similar material. The shelf 1 is connected to a rear support structure 11. The rear support structure 11 may be constructed from a substantially rigid material. This may be the same material as the shelf 1, or it may be a different material.

In some forms, a shelf liner (not shown) may be placed on at least a portion of the shelf. For example, the shelf liner may cover at least some of a bottom wall 2 and/or side walls 6 of the shelf 1. The shelf liner may be constructed from a different material than the shelf 1. For example, the shelf liner may be constructed from a flexible material (e.g., rubber and/or flexible plastic, and the liner may have a team logo or other personalized design).

In some forms, the material used to construct the shelf liner may have a coefficient of friction that is higher than the coefficient of friction of the shelf. In some forms, the shelf liner may include surface features (e.g., ridges, surface roughness, etc.), which may assist in retaining items in the shelf 1 as described in more detail below.

Adjustable Shelf

The shelf 1 may be adjustable to allow the user to select between various desired deployed positions. The various deployed positions may be beneficial for carrying different sized items on the shelf 1. Moreover, the adjustable nature of the shelf may allow the user to move the shelf such that more or less space is provided below the shelf, depending on user preference.

As shown in FIGS. 1 to 3, some forms of the system 100 may include different connection features in order to position the shelf 1 at different heights relative to the floor of the vehicle. The different positioned heights of the shelf 1 may help raise the shelf 1 so that items may be stored under the shelf 1 on the floor of the vehicle. Alternatively, a lower height of the shelf 1 may allow the bottom wall 2 to support larger objects while limiting extension over the top of the seat (e.g., and interfering with the head of the users).

In some forms, the support structure 11 may include the connection features, which may enable a connection between the shelf 1 and the support structure 11.

As illustrated in FIG. 3, the support structure 11 may include a pair of first pins 30. The first pins 30 may be connected to side bars 14 of the support structure 11 that connect the top bar 12 to the bottom bar 15. The illustrated example shows that the first pins 30 are permanently connected to the respective side bar 14, although the first pins 30 may also be removably and/or adjustably connected. The first pins 30 also may be disposed approximately half-way between the top bar 12 and the bottom bar 15.

In some forms, the top pins 30 may include a support bar 32 and a connection portion 34. The support bar 32 may be connected (e.g., welded) to the respective side bar 14. The illustrated support bar 32 includes a rectangular shape, although any shape (e.g., rounded) may be used. The connection portion 34 may extend from the support bar 32 toward a center of the support structure 11 (e.g., toward the opposite side bar 14). The illustrated connection portion 34 may have a cylindrical shape.

In certain forms, the distance between the ends of the connection portions 34 may be approximately equal to the length of the shelf 1.

As shown in FIG. 2, some forms of the support structure 11 may include bottom pins 36, which may be spaced apart from the top pins 30. The top and bottom pins 30, 36 on each side of the support structure 11 may be aligned (e.g., along an axis substantially parallel to the side bars 14). Specifically, the ends of the top and bottom pins 30, 36 on either side of the support structure 11 may be aligned with one another.

In some forms, the bottom pins 36 may be fixed to (e.g., integrally formed with) the bottom bar 15 and/or the respective side bar 14. The bottom pins 36 may not have a free end while in use because either end is connected to one of the bars 14, 15. The bottom pins 36 may extend parallel to the bottom bar 15 in order to form part of the perimeter of the support structure 11.

In some forms, the bottom pins 36 may each include a connection portion 38 that is substantially the same as the connection portion 34 of each top pin 30. For example, the connection portions 38 may include a cylindrical shape.

Figure 5:
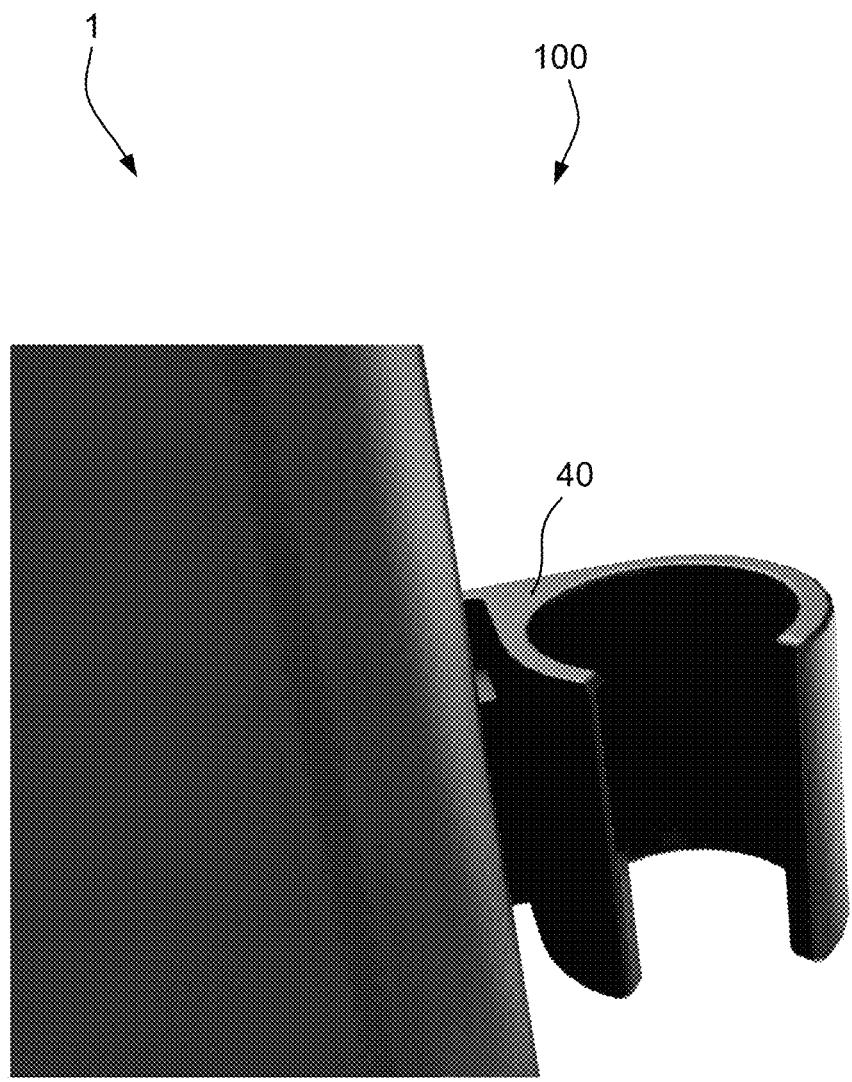
FIG. 5 is a perspective view of a clip forming part of the connection mechanism according to FIG. 4.
Figure 6:
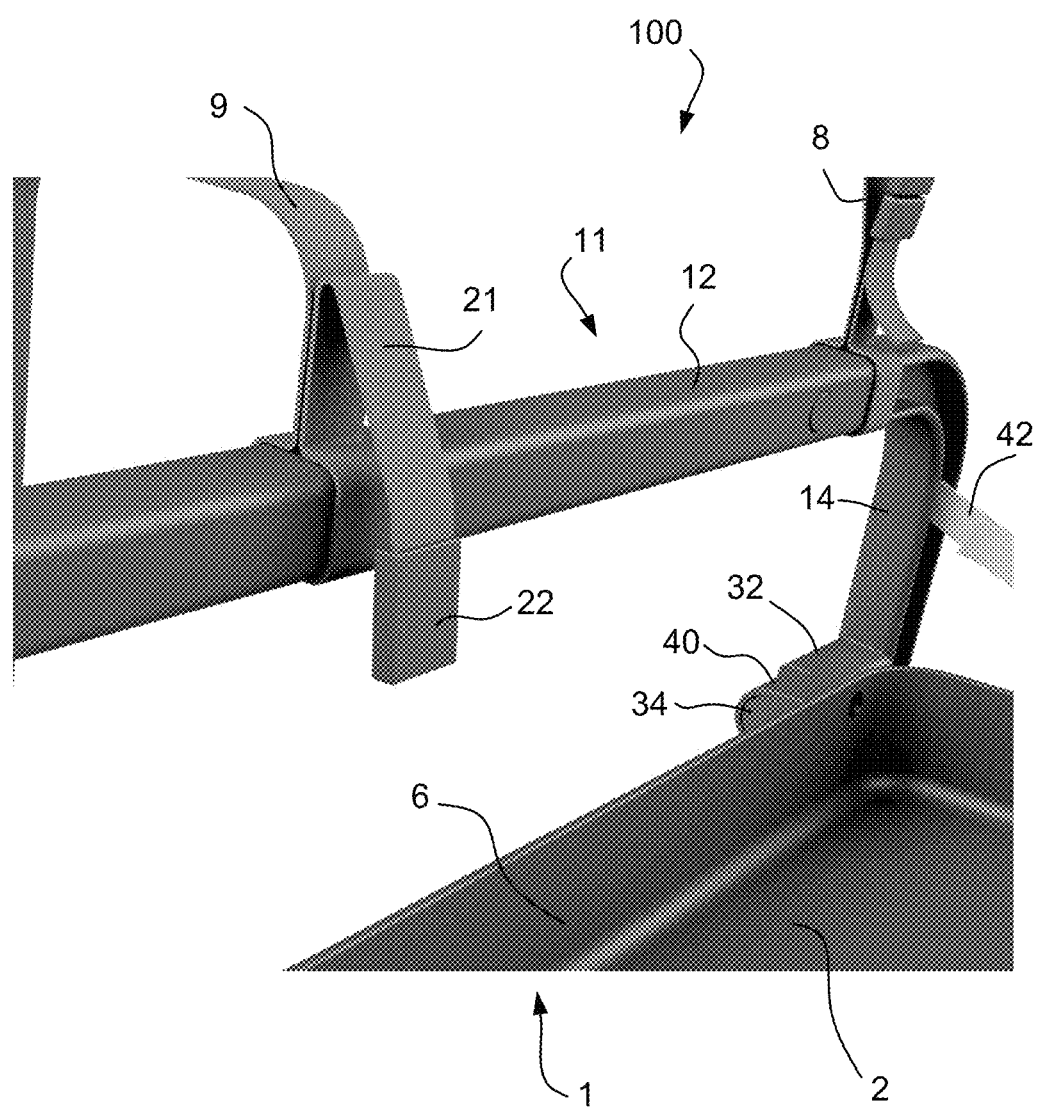
FIG. 6 is a detail view of a rear support structure of the trunk shelf system according to FIG. 1, including a plurality of straps.
Figure 7:
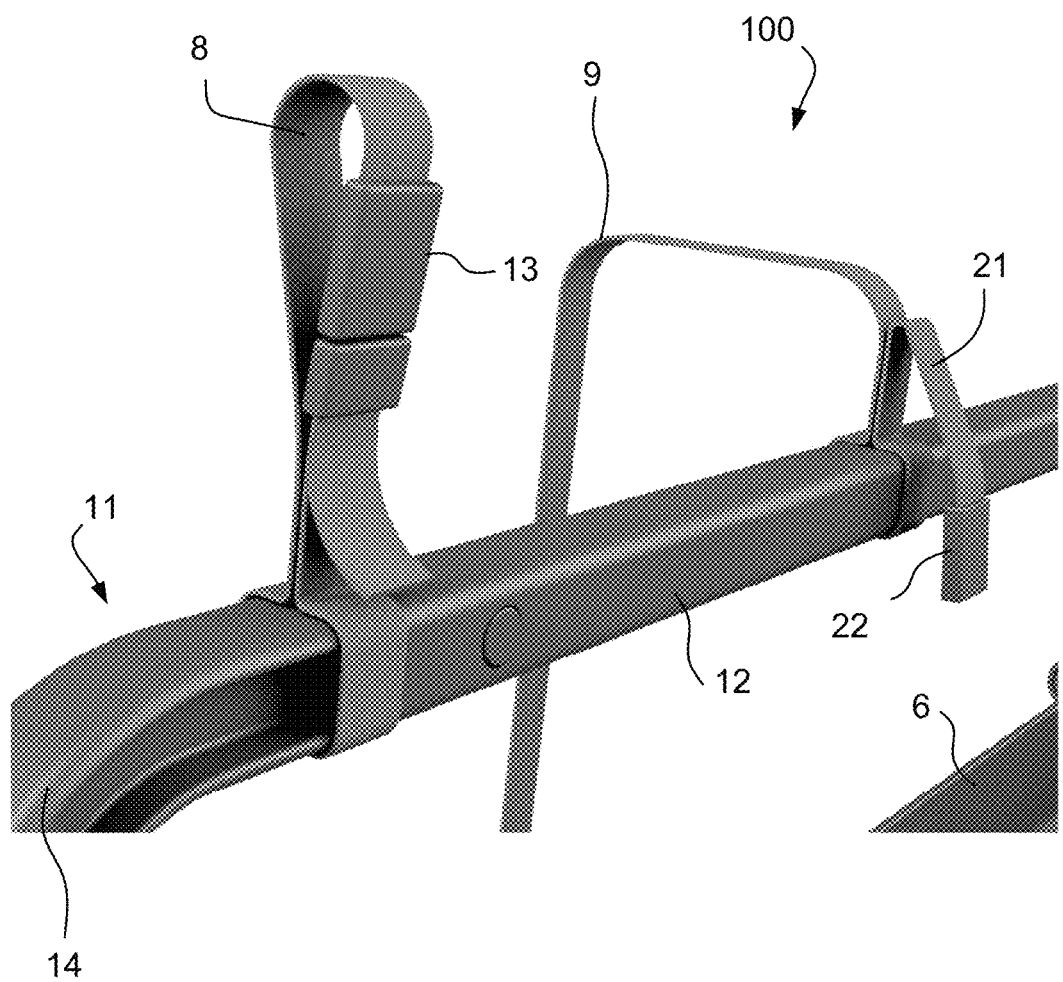
FIG. 7 is an alternate detail view of a rear support structure of the trunk shelf system according to FIG. 1, including a plurality of straps.

As shown in FIG. 5, the shelf 1 may include at least one clip 40 (e.g., a pair of clips 40). The clips 40 may be connected to the shelf 1. The illustrated example shows the clip 40 permanently connected to the side wall 6 of the shelf 1, e.g., clip 40 extends rearwardly from the rear part of the side wall. However, the clip 40 may be connected to another portion of the side wall 6 and/or the bottom wall 2 without departing from the scope of the technology. Similarly, other examples may include at least one clip 40 that is removably connected to at least one of the walls 2, 6.

In some forms, the clip 40 may be substantially C-shaped in cross section. In other words, the side or cross-sectional view of the clip 40 may be a curvilinear shape with an open perimeter or shape with an opening that is smaller than the diameter/dimension of the pin. The open perimeter may form a round (e.g., partially circular) shape.

Figure 4:
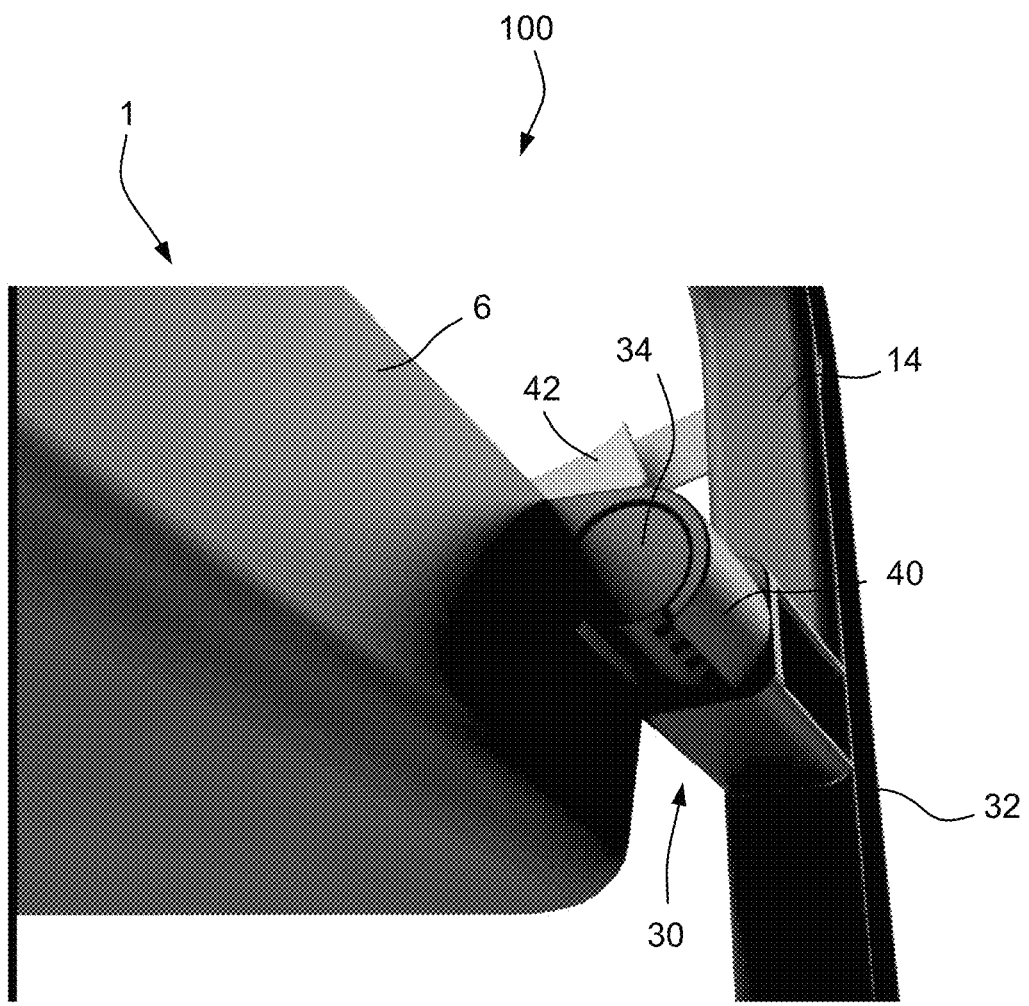
FIG. 4 is a perspective view of a connection mechanism of the trunk shelf system according to FIG. 1.

As shown in FIG. 4, the clip 40 may connect to connection portion 34 of the pin 30. For example, the clip 40 may be removably connected to the connection portion 34. This may be accomplished using a snap fit, or any similar mechanical engagement. For example, the clip 40 may have one or more arms that temporarily and resiliently flex to overcome the larger size of the pin, and then the one or more arms flex back to secure the clip 40 to the pin. In an alternative, the pin may be provided to the shelf and the clip may be provided to the support structure.

Returning to FIGS. 1 and 2, connecting the clips 40 to the connection portions 34 of the pins 30 may positioned the shelf 1 between the top bar 12 and the bottom bar 15. When connected in this first deployed position, the clips 40 may be able to rotate with respect to the pins 30. The user may adjust an angle of the shelf 1 (e.g., of the bottom wall 2) with respect to the floor of the vehicle.

The angle may be selected to be parallel to the vehicle's floor, but it also may be selected to be inclined towards or away from the rear seat (or up or down compared to the horizontal position), depending on user preference. As described in more detail below, the system 100 may include various straps in order to retain the shelf 1 at the desired angle. In other examples, the clip 40 and the pin 30 may interface with a ratchet mechanism (with a plurality of set positions, e.g., 2, 3, 4, 5 or 6 or up to 10 positions) so that they are not freely rotatable relative to one another.

As shown in FIG. 3, the clips 40 may be disconnected from the top pins 30 and instead connected to the bottom pins 36. As described above, the top and bottom pins 30, 36 may include the substantially same shape and dimensions so that the clip 40 may connect to either set of pins 30, 36. For example, the snap fit connection may allow the shelf 1 to be repeatedly moved between the two sets of pins 30, 36.

In another alternative, the system may include a pair of shelves, where one is connected to the upper set of pins and the other is connected to the bottom set of pins.

In some forms, the shelf 1 may be positioned at least partially below the bottom bar 15 when connected to the pins 36. This may create more space between the bottom surface and the top bar 12.

In alternate forms (not shown), the clip 40 may be replaced with another type of connector. For example, a magnet may be used to connect the shelf 1 to one of the pair of pins 30, 36. The magnet may also be used in conjunction with the clip 40.

FIGS. 13 to 16 illustrate another example of the present technology, aspects of which may be combined with the example of FIGS. 1-12. Like reference numbers represent like parts, but in FIGS. 13-15, each reference number includes a "200" series reference number.

Figure 13:
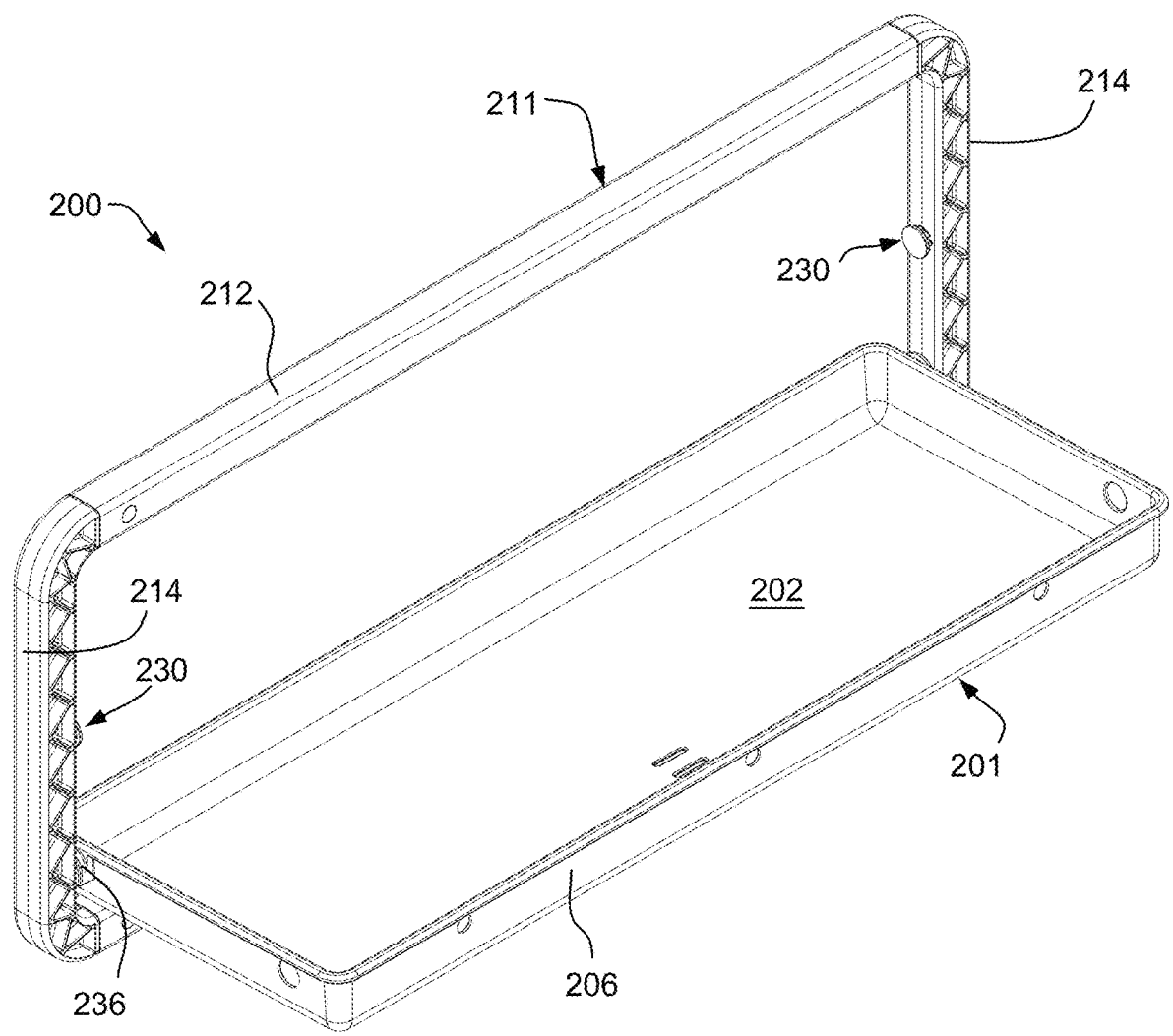
FIG. 13 is an upper perspective view of a trunk shelf system in a first in use position according to another aspect of the present technology.

FIG. 13 shows a system 200 having a shelf 201 connected to a rear support structure 211.

The shelf 201 may be adjustable to allow the user to select between various desired deployed positions.

Figure 14:
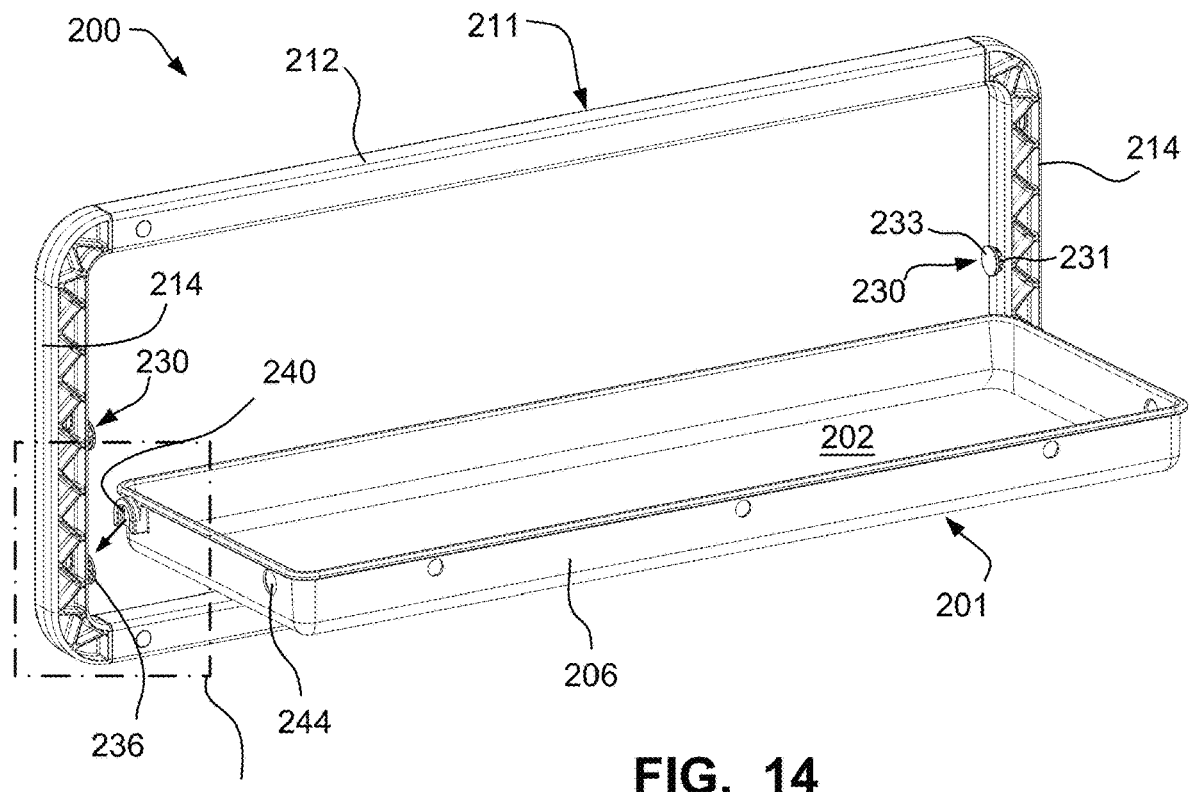
FIG. 14 is another perspective view of the trunk system of FIG. 13, where the shelf is detached from the support structure.
Figure 15:
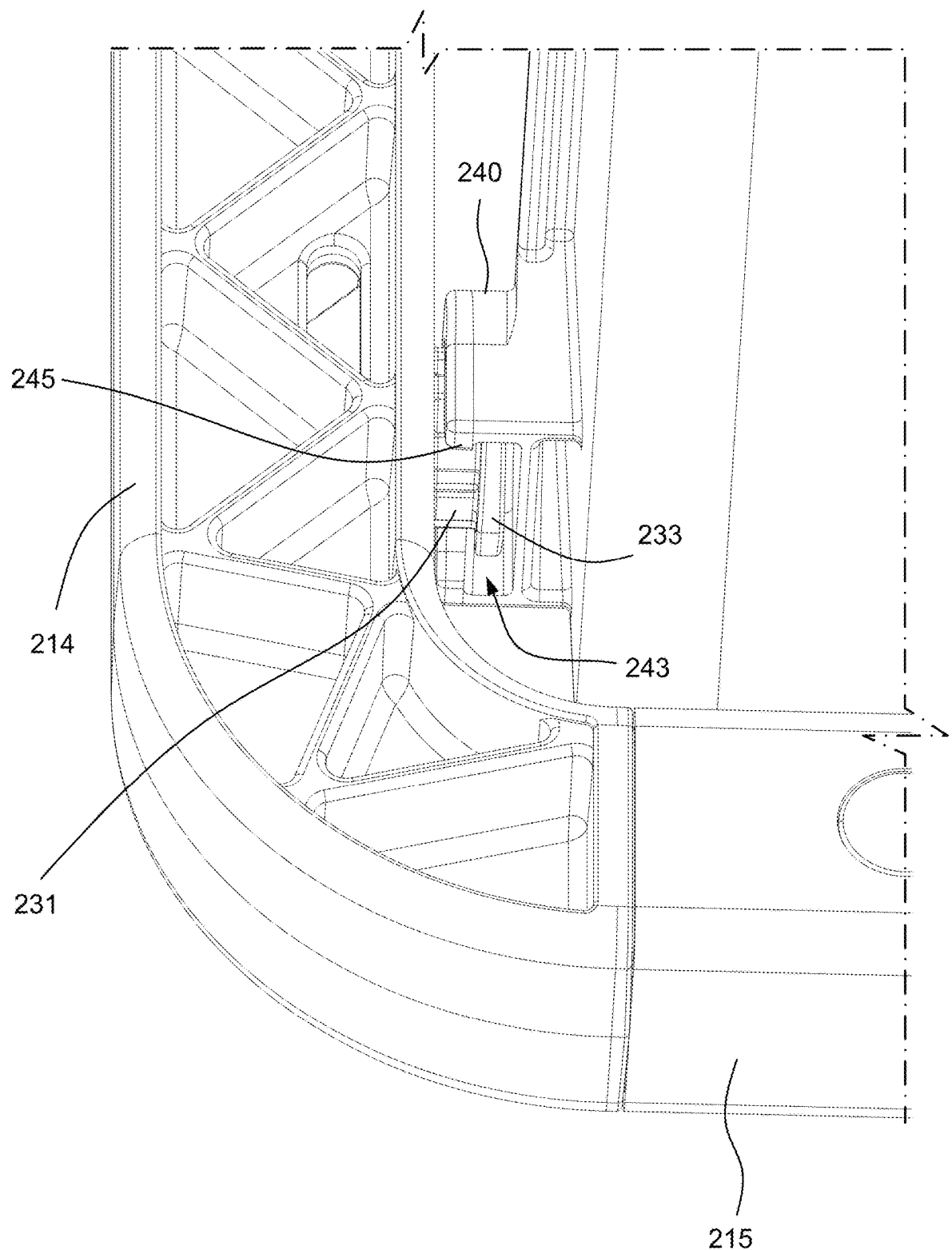
FIG. 15 is similar to FIG. 14A, but shows the shelf and support structure in an assembled condition.

As shown in FIGS. 13 to 15, system 200 may include connection features to enable a connection between the shelf 1 and the support structure 211. The connection features may be provided to position the shelf 201 at different heights relative to the floor of the vehicle.

In some forms, the support structure 211 may include the connection features, which may enable a connection between the shelf 201 and the support structure 211.

As illustrated in FIGS. 13-14, the support structure 211 may include a pair of first pins 230. The first pins 230 may be connected to side bars 214 of the support structure 11 that connect the top bar 212 to the bottom bar 215. The illustrated example shows that the first pins 230 are permanently connected to the respective side bar 214, although the first pins 230 may also be removably and/or adjustably connected. The first pins 230 also may be disposed approximately half-way between the top bar 212 and the bottom bar 215.

The first pins 230 may extend toward a center of the support structure 211 (e.g., toward the opposite side bar 14).

The illustrated first pins 230 may have a shaft 231 connected to the wall and a head 233 that is enlarged compared to the shaft 231.

Figure 14A:
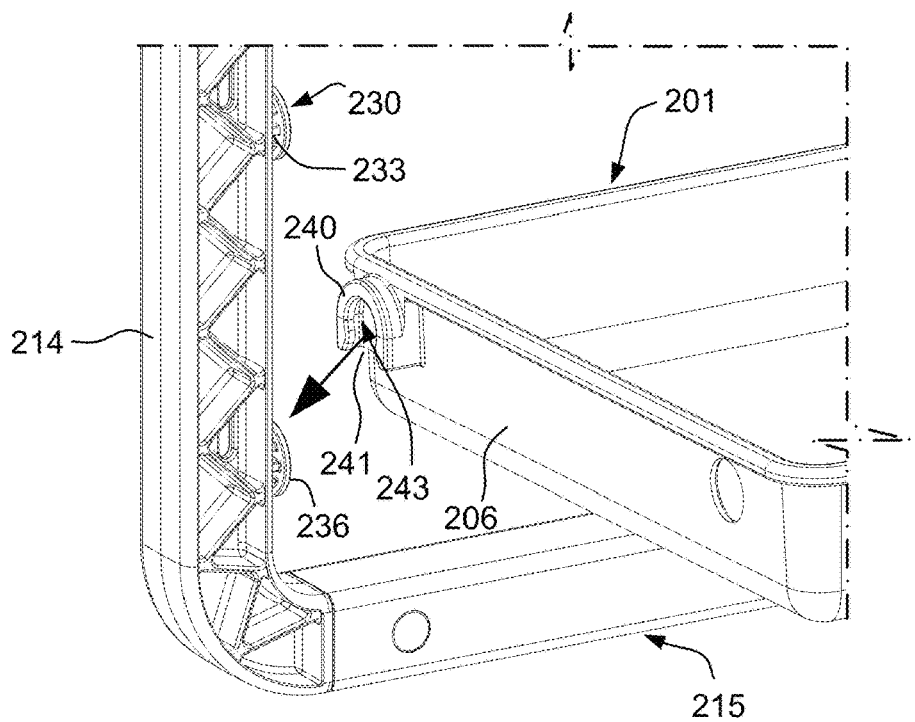
FIG. 14A is a detailed and enlarged view taken from FIG. 14.

As shown in FIG. 14A, some forms of the support structure 211 may include bottom pins 236, which may be spaced apart from the top pins 230. The top and bottom pins 230, 236 on each side of the support structure 211 may be aligned (e.g., along an axis substantially parallel to the side bars 214). Specifically, the ends of the top and bottom pins 230, 236 on either side of the support structure 211 may be aligned with one another.

In some forms, the bottom pins 236 may be fixed to (e.g., integrally formed with) the respective side bar 214.

In some forms, the bottom pins 236 may each a shaft and head that are substantially the same as the top pins 230.

Figure 16:
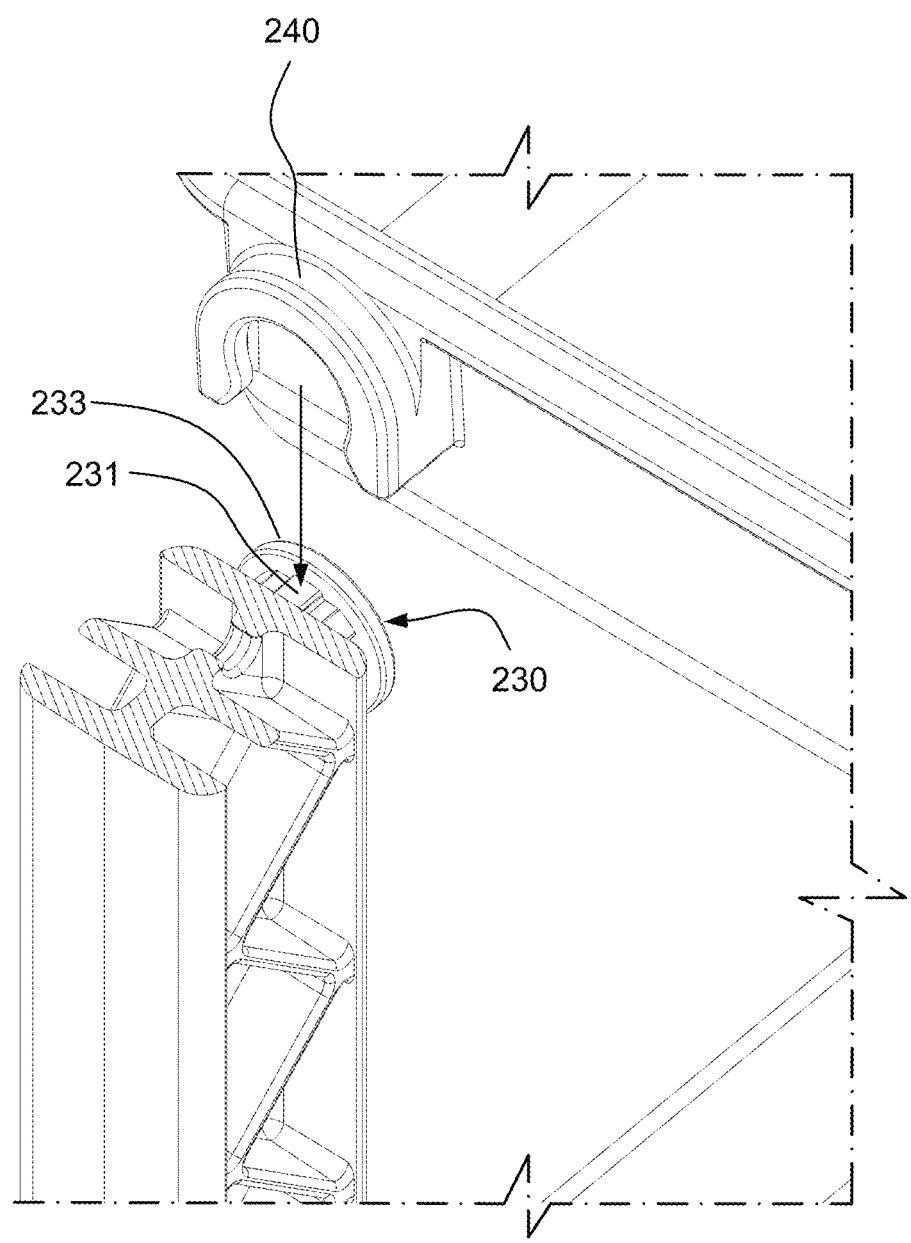
FIG. 16 is an exploded part cross sectional view showing a position just before connecting the shelf to the support structure.

As shown in FIGS. 14-16, the shelf 201 may include at least one clip 240 (e.g., a pair of clips 40). The clips 240 may be connected to the shelf 201. The illustrated example shows the clip 240 permanently connected to the side wall 206 of the shelf 201. However, the clip 240 may be connected to another portion of the side wall 206 and/or the bottom wall 202 without departing from the scope of the technology. Similarly, other examples may include at least one clip 240 that is removably connected to at least one of the walls 202, 206.

In some forms, the clip 240 may be substantially C-shaped. The side view of the clip 240 may be a curvilinear shape with an open perimeter or shape with an opening 241 that is smaller than the diameter/dimension of the shaft 231 of the pin. The open perimeter may form a round (e.g., partially circular) shape. As shown in FIG. 14A, the opening 241 is positioned to face an extended plane of the support surface of the shelf, such that when the shelf 201 is in the deployed position the opening 241 faces downwards and a channel 243 receives the head 233. The outer part of the channel 243 may be bound by a flange 245 that helps to retain an inner surface of the head 233.

Stated differently, the clip 240 may connect to a connection portion (e.g., shaft and/or head) of the pin 230. For example, the clip 240 may be removably connected to the connection portion. This may be accomplished using a snap fit, or any similar mechanical engagement. For example, the C-shape of the clip 240 may have one or more arms that temporarily and resiliently flex to overcome the larger size of the pin, and then the one or more arms flex back to secure the clip 240 to the pin. In an alternative, the pin may be provided to the shelf and the clip may be provided to the support structure.

Connecting the clips 240 to the connection portions of the pins 230 may position the shelf 201 between the top bar 212 and the bottom bar 215. When connected in this first deployed position, the clips 240 may be able to rotate with respect to the pins 230. The user may adjust an angle of the shelf 201 (e.g., of the bottom wall 202) with respect to the floor of the vehicle.

As described in more detail below, the system 200 may include various straps in order to retain the shelf 201 at the desired angle. In other examples, the clip 240 and the pin 230 may interface with a ratchet mechanism (with a plurality of set positions, e.g., 2, 3, 4, or 6 or up to 10 positions) so that they are not freely rotatable relative to one another.

The clips 240 may be disconnected from the top pins 230 and instead connected to the bottom pins 236. As described above, the top and bottom pins 230, 236 may include the substantially same shape and dimensions so that the clip 240 may connect to either set of pins 230, 236. For example, the snap fit connection may allow the shelf 201 to be repeatedly moved between the two sets of pins 230, 236.

Straps

With continued reference to FIGS. 1 to 3, the system 100 may include a plurality of straps that may assist in the retaining the shelf 1 in the desired deployed position.

In some forms, a strap 42 may be connected to either side of the system 100 in order to retain the shelf 1 at the desired angle. The illustrated straps 42 may be constructed from a textile material, although other materials may be used. For example, the straps may be constructed from an elastic material or from a rigid material.

In some forms, the side walls 6 may include a pair of openings 44. Each opening 44 may be disposed on a respective lateral side of the shelf 1. The openings 44 may also be disposed toward a front of the shelf 1 (e.g., distal to the support structure 11).

In alternate examples, the side walls 6 may include a single opening. This opening may be disposed in a center of the side wall 6 opposite to the support structure 11.

In some forms, the support structure 11 may include a pair of slots 46. Each slot 46 may be disposed on a respective lateral side of the support structure 11. For example, each slot 46 may be disposed on a respective side bar 14. The illustrated slots 46 may be disposed proximate to the top bar 12, although the slots 46 may be positioned along any length of the side bars 14.

In other forms, the support structure 11 may include a single slot 46 on the top bar 12. The single slot 46 may be disposed in a center of the top bar 12, which may be similar to a possible position of a single opening on the side wall 6.

Figure 8:
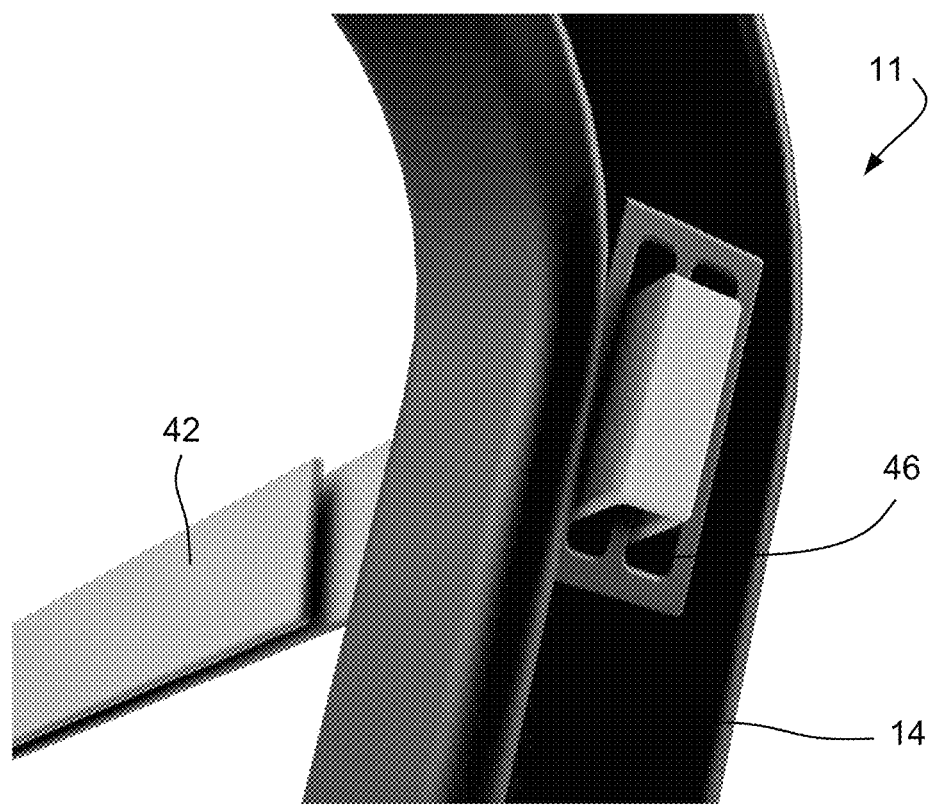
FIG. 8 is a detail view of a connection between the rear support structure and a strap of the trunk shelf system according to FIG. 1.

As shown in FIG. 8, the slot 46 may be a loop around which the strap 42 may be threaded. The strap 42 may not be fixed to the support structure 11 so that it can be removed and/or replaced (e.g., with a new strap 42 and/or a different sized strap 42).

Figure 9:
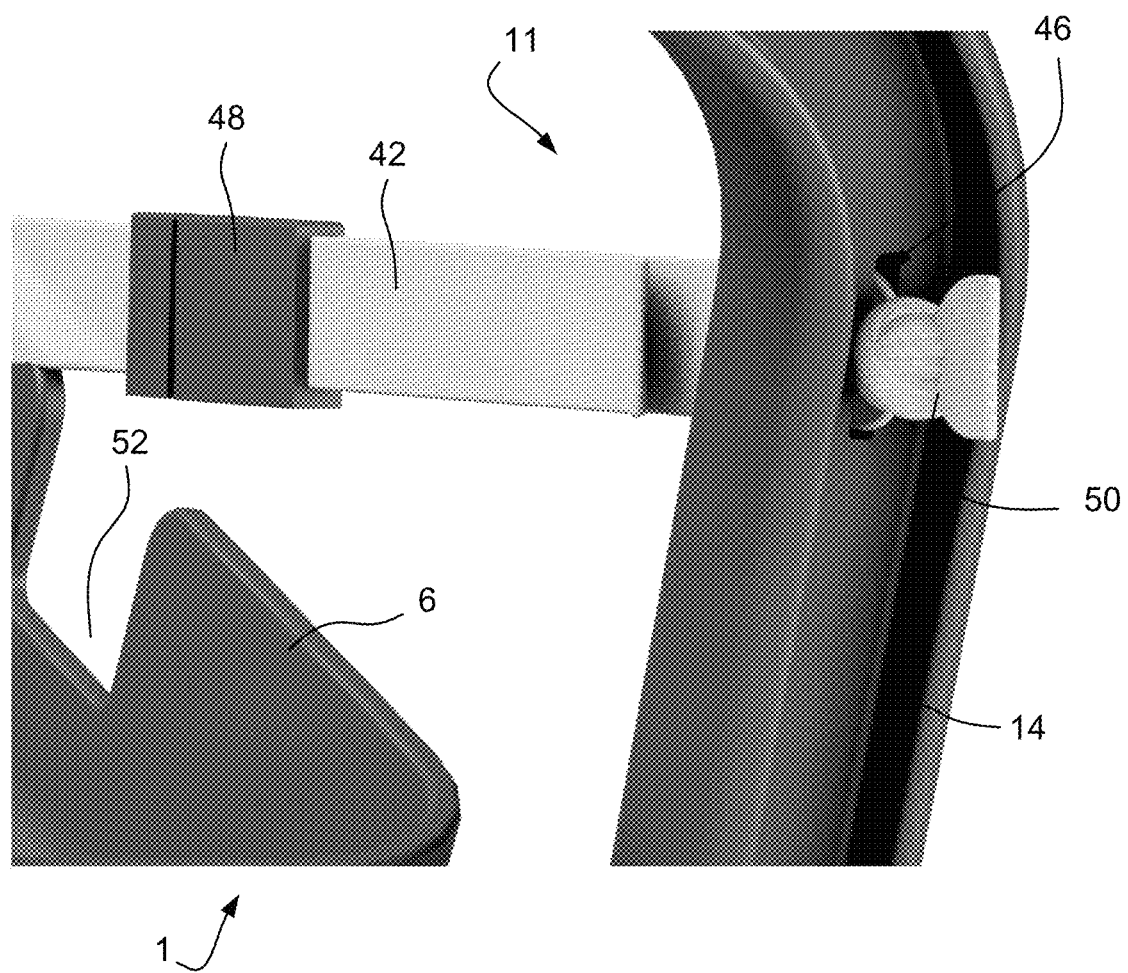
FIG. 9 is a detail view of an alternate connection between the rear support structure and a strap of the trunk shelf system according to FIG. 1.
Figure 10:
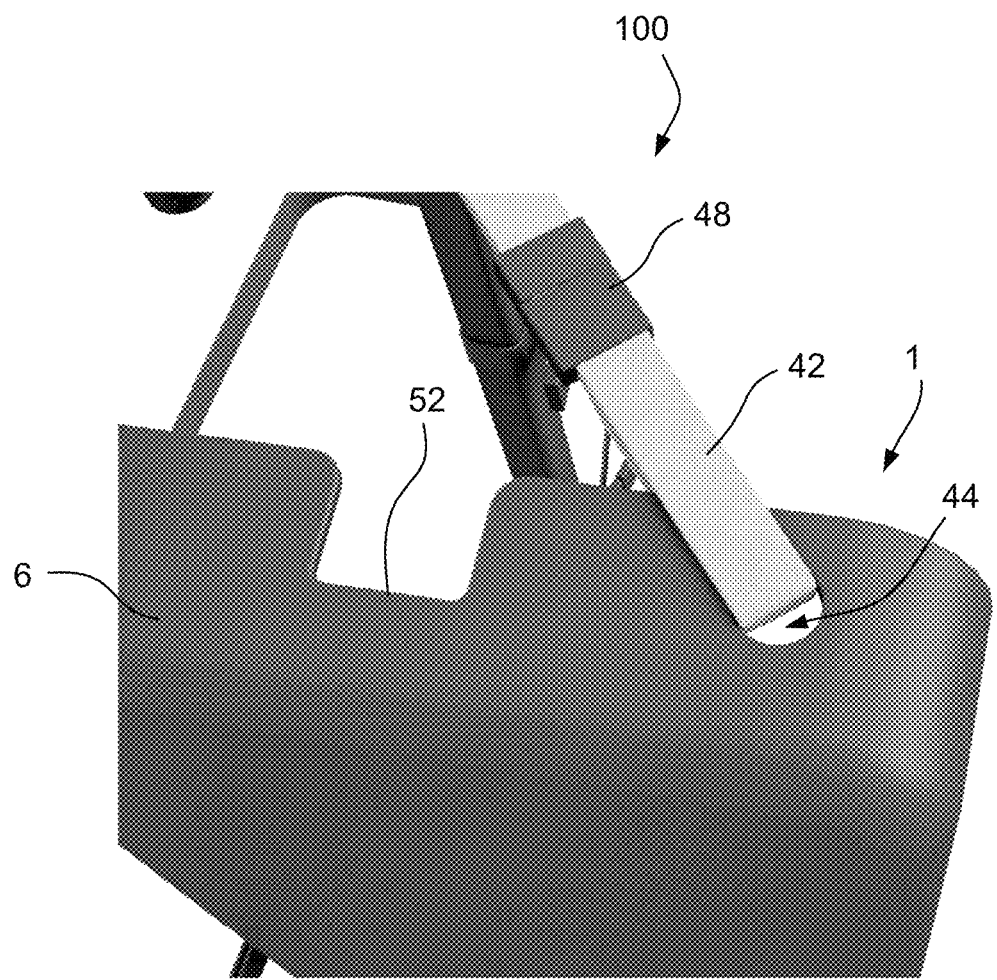
FIG. 10 is a detail view of a connection between a shelf and a strap of the trunk shelf system according to FIG. 1.

As shown in FIG. 9, an alternate slot 46 may be a single opening through which the strap 42 is threaded. The strap 42 may include a knot 50 at one end. The knot 50 may be larger than the slot 46 and the buckle 48 may be larger than the slot 46. This may limit the ability of the user to remove the strap 42 from the support structure through the slot 46.

In some forms, each strap 42 may include a buckle 48 with a ladder lock or similar mechanism to adjust a length of the strap. When the shelf 1 is in either deployed position, the straps 42 may form a triangular shape with respect to the side bar 14 and the side wall 6.

With continued reference to FIGS. 1 to 3, the length of the straps 42 may be adjusted between the first deployed position (see e.g., FIGS. 1 and 2) and the second deployed position (see e.g., FIG. 3). For example, the shelf 1 (and therefore the openings 44) may be further from the slots 46 in the second deployed position than in the first deployed position. Thus, the length of the straps 42 may be extended in order to reach this greater length. Alternatively, the straps 42 illustrated in FIGS. 1 and 2 may be replaced with longer straps 42 for the second deployed position in FIG. 3. This may allow for the use of more rigid materials (e.g., metal) in the straps 42.

In either deployed position, the straps 42 may be positioned (e.g., tightened) into a taut position, which may assist in counterbalancing the gravitational force of the shelf 1 and any items place on the shelf 1. This may maintain the bottom wall 2 at the desired position relative to the floor of the vehicle.

In certain forms, at least one level indicator, e.g., a vial type "bubble" level mostly filled with liquid and including a bubble (not shown), may be provided to indicate whether the shelf is level. For example, the indicator 5 may assist the user in horizontally positioning the bottom wall 2, which may be parallel to the vehicle floor but it also may be slightly inclined towards the seatback to keep any items on the shelf in place, especially during operation of the vehicle.

Cargo Netting

The system may include detachable sturdy cargo netting (not shown) that extends over top of the shelf 1.

The netting can be attached to the shelf 1 to prevent cargo from falling off the shelf 1. The netting may be stretchable in order to fit over different items stored on the shelf. This may be particularly helpful when items placed on the shelf 1 extend more superior than the top of the side walls 6. The stretchable cargo net may attach to at least a portion of the perimeter of the side walls along the perimeter. The cargo net may also attach to at least a portion of the support structure 11 that attaches to the seatback. Netting may also function to help support the shelf 1 in case of heavy cargo (e.g., by providing an additional force in the superior direction that resists the gravitational force of the shelf 1 and items placed on the shelf 1).

Dividers

The system may include one or more horizontal dividers (not shown) that can detach or fold down when not in use. The bottom wall 2 and/or the side walls 6 of the shelf 1 may include one or more divider supports that may include a slot to retain the dividers in the vertical position. The position of the dividers can be fixed or repositionable. For example, the one or more dividers may be equal to or less than the height of the side walls 6 (e.g., as measured from the bottom wall 2), and may be fixed within the divider supports. The shelf 1 may be foldable into the stowed position without interference from the dividers. Alternatively, the dividers may be removably positionable within the divider supports (e.g., via frictional engagement and/or by sliding into the divider supports). The dividers may be removed from the divider supports when the shelf 1 is in the closed position and may be connected to the divider supports when the shelf 1 is in the in use position.

In other forms, the bottom wall 2 and the dividers may be formed in one piece (e.g., using a "living" hinge) or be integrally formed. The dividers may be biased toward an upright position (e.g., approximately 90° with respect to the bottom wall 2). The dividers may be movable (e.g., pivotable) toward a stowed positioned (e.g., substantially parallel to the bottom wall 2). This allows the dividers to be stowed in a compact position, and then spring to life when the shelf 1 is in an in use position.

In some forms, the dividers may alternatively be in the form of a belt that stretches from the seat back to the front of the shelf 1 (e.g., between the side walls 6 in a direction toward or away from the seat). The belt dividers may be like seat belts, extending from a retracted position to the front part of the side wall, attached with a fastener (e.g., a clip, like those used for seat belts, a magnet, etc.) that allows for removable connection. Some additional dividing material, such as nets, can be suspended from the belt dividers. Dividers may alternatively be formed from rope, bungee, and/or wire. Dividers may be extendable if the shelf 1 is moved to an extended position.

Securing System

A securing system attaches the shelf 1 to the vehicle's seat. For example, a belt system may include one or more belts, straps or cords 8 to secure the support structure 11 to the rear of the vehicle's seat, e.g., by a pair of headrest belts 8 that loop around the vehicle's headrests. One belt 8 is located towards the left side, and the other belt 8 is located towards the right side. The belts 8 for both sets are anchored on a top bar 12 of the system. The belts 8 loop around the metal support structure of the rearmost seating row headrests, and are connected via a buckle 13. The belts 8 are adjusted in length according to the size of the headrests on which they are fastened.

The straps may be fixed in place relative to the support structure 11, or they may be adjustable to compensate for varying distance between the headrests. Adjustability may be provided in a number of different ways, e.g., belts 8 may include one or more magnetic connectors that are attached to different lateral positions along the top bar 12 of the support structure 11. In addition or in the alternative, the top bar 12 may include a number of slots along its length in order to allow the user to select the appropriate slot that aligns with the headrests.

In use, each belt 8 may be wrapped around the respective headrest and connected to itself via a buckle 13 (although other connectors, like magnets, hook and loop material, other mechanical fasteners may be used). Alternatively, the top bar 12 may include a top bar buckle (not shown) that is connectable to the buckle 13. The spacing between the connection of the respective belt 8 to the top bar 12 and the top bar buckle may be approximately the width of a headrest.

The belt system may also include a central belt 9 that may be wrapped around the vehicle seat and connected, e.g., via a buckle 16 having a male part and a female part that are snapped together. Belt 9 is anchored at the top of the support structure 11. The belt 9 loops vertically around the rearmost seating row, and secures the device flush against the backside of the seat. Belt 9 may be adjusted in length according to the size of the seatback on which it is fastened.

In some forms, the buckle 16 may be positioned on the rear surface of the seat while in use. The rear surface may be opposite to the seating surface where the user places their back. This may keep the buckle 16 away from the user in order to avoid interference.

As shown in FIG. 1, some forms may include the buckle 16 below the bottom surface 2 of the shelf 1 while in use. This may limit obstruction from any items stored on the shelf 1.

Belt 9 is positioned between the headrest belts 8. The system may also include additional features to maintain the support structure in abutment with the rear of the vehicle seat, such as hook and loop fasteners (to attach to seat backs that may be carpeted). In additional, certain vehicles have additional structures to which the support structure may be secured, e.g., small bar built in to the back of the seat.

The belts 8, 9 may be made of a lightweight and/or sturdy material, such as nylon. Polyester, acrylic and/or treated cotton may be used alternatively and/or additionally.

As shown in FIG. 2, the securing system may include a further belt 17 connected to the support structure 11 and another belt 18 connected to the shelf 1, e.g., on the side wall 6 or elsewhere. In some forms, the belt 17 may be connected to the support structure 11 via the belt 9. The belts 17, 18 are associated with respective buckle parts 19, 20.

As shown in FIG. 2, the belt 17 connected to the support structure 11 may be connected to the belt 18 connected to the shelf 1 via the connection of the buckle parts 19, 20. The belt 17 (and/or the belt 18) may be tightened in order to secure the shelf 1 in the in use position (e.g., to limit or prevent movement in the superior or posterior direction).

Figure 11:
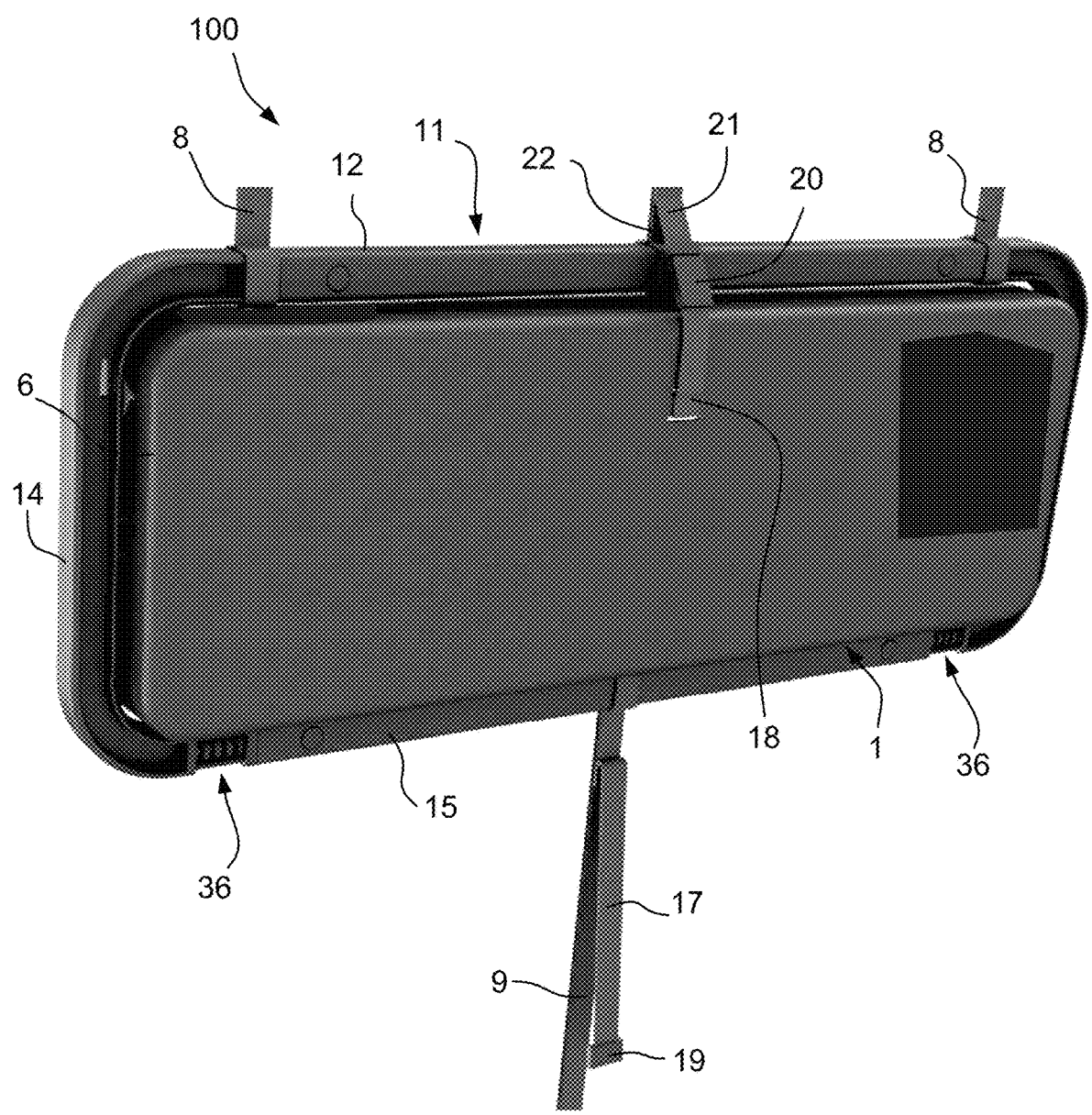
FIG. 11 is another front perspective view showing the trunk shelf system according to FIG. 1 in the stowed position.

As shown in FIG. 11, when the shelf 1 is in the stowed position, the buckle parts 19, 20 may be disconnected from one another and the buckle part 20 may be connected to a further buckle part 22 of belt 21. The belt 21 may be connected to the support structure 11 proximate to the central belt 9. For example, FIGS. 3 and 7 the belt 21 may be connected to the central belt 9. The shelf 1 may be moved toward the support structure 11. The buckle part 22 may be substantially the same as the buckle part 19 so that the buckle part 20 may be interchangeably connected to either. Connecting the buckle parts 20, 22 together and tightening the belt 18 and/or the belt 21 may secure the shelf in the stowed position (e.g., and limit movement toward and away from the seat back and/or the support structure 11). When it is desired to move the shelf 1 to the deployed position, the buckle parts 20, 22 are detached as shown in FIG. 1.

The belts 8, 9 17, 18, 21 may be length adjustable, e.g., using hook and loop mechanisms, using ladder locks, mechanical fasteners, and/or magnets.

Alternatively, or in addition, the shelf 1 can be locked or secured into the stowed position via one or more magnets, a locking hinge or link, or a latch system. For example, the shelf 1 may include one or more shelf magnets that are intended to match the position of magnets on the support structure 11. Thus, when the shelf 1 is raised to the stowed position, the magnets on the shelf 1 are attracted to the magnets on the support structure 11

Extension System

The system may allow users to move the shelf from a retracted position to an extended position closer to the opening of the trunk while the shelf 1 is in an in use position.

For example, a portion of the bottom wall 2 and/or side walls 6 may be telescopic so that a user may pull the shelf 1 forward toward the trunk opening while the rearward component remains in place. This may extend the surface area of the bottom wall 2 so that more items may be stored.

Alternatively and/or additionally, the side walls 6 may be extendable (e.g., telescopically extendable) relative to the bottom wall 2. This may create a larger storage volume within the shelf 1, which may assist in retaining larger items.

Support Legs

In some forms, one or more collapsible and/or detachable telescoping legs (not shown) may be attached to the shelf 1. For example, legs are structured to provide additional support for very heavy items and/or when the shelf 1. The legs may be extended or positioned in a retracted and/or folded position, allowing the user to stow the repositionable shelf flat against the seatback.

Customizing

The repositionable shelf can be customized with a "skin," or design (name, label, sign, symbol, etc.) for the underside of the shelf with user's monogram, college or pro team logo, company name, etc. When stowed, the shelf prominently displays this logo or design. This same customizable skin or cover can be placed on the top of the shelf, too. When the detachable track system is in place to allow the shelf to move forward to the opening of the trunk, the top of the shelf's design or logo would be prominently displayed.

Stowed Position

As described above, FIG. 11 may illustrate a stowed position of the system 100 (e.g., a non-use position). In the stowed position, the shelf 1 may be moved (e.g., pivoted) so that it is no longer substantially parallel to the floor of the vehicle. For example, the bottom surface 2 may be substantially parallel to the back of the seat. In this position, the shelf 1 may take of a smaller volume of space so that the system may be easily stored. The user may also leave the system 100 connected to the seat, while using the smaller stowed position to free up more space within the vehicle.

In other examples (not shown) the shelf 1 may not be movable (e.g., pivotable) relative to the upper pins 30 and/or lower pins 36. Instead the shelf 1 may be disconnected and reconnected in order to move to the stowed position.

As described above, buckle parts 20, 22 of belts 18 and 21 respectively may be connected together in order to retain the shelf 1 in the stowed position. The outer perimeter of the shelf 1 (e.g., the outer dimensions of the side walls 6) may be smaller than the inner dimensions of the support structure 11 so that the shelf 1 may move into the central opening of the support structure 11 in the stowed position.

As shown in FIG. 11, the shelf 1 may begin in the second deployed position prior to moving into the stowed position. For example, the dimension of the shelf 1 is approximately the size of the inner dimension of the support structure 11. When the clips 40 are connected to the bottom pins 36, the shelf 1 is able to move (e.g., pivot) into the opening of the support structure 11 without interfering with the top bar 12. Although, as described above, the shelf 1 may be disconnected and reconnected in the stowed position.

In some forms, the shelf 1 may include notches 52 in the side wall 6. For example, each notch 52 may be disposed on a lateral side of the shelf proximate to and spaced apart from the respective opening 44. The notch 52 is illustrated as having a rectangular shape, although any shape may be used.

In certain forms, each notch 52 may be approximately centered along the lateral side wall 6. More specifically, a distance between a notch 52 and the respective clip may be approximately the same distance as between the upper pin 30 and the lower pin 36 on the same side.

As the shelf 1 is positioned in the showed position, the upper pins 30 may be received within the respective notch 52. The depth of each notch 52 may be approximately equal to or greater than the diameter of the connection portion 34. This may allow the shelf 1 to fully fold into the stowed position (e.g., without substantial interference between the side walls 6 and the connection portions 34).

Figure 12:
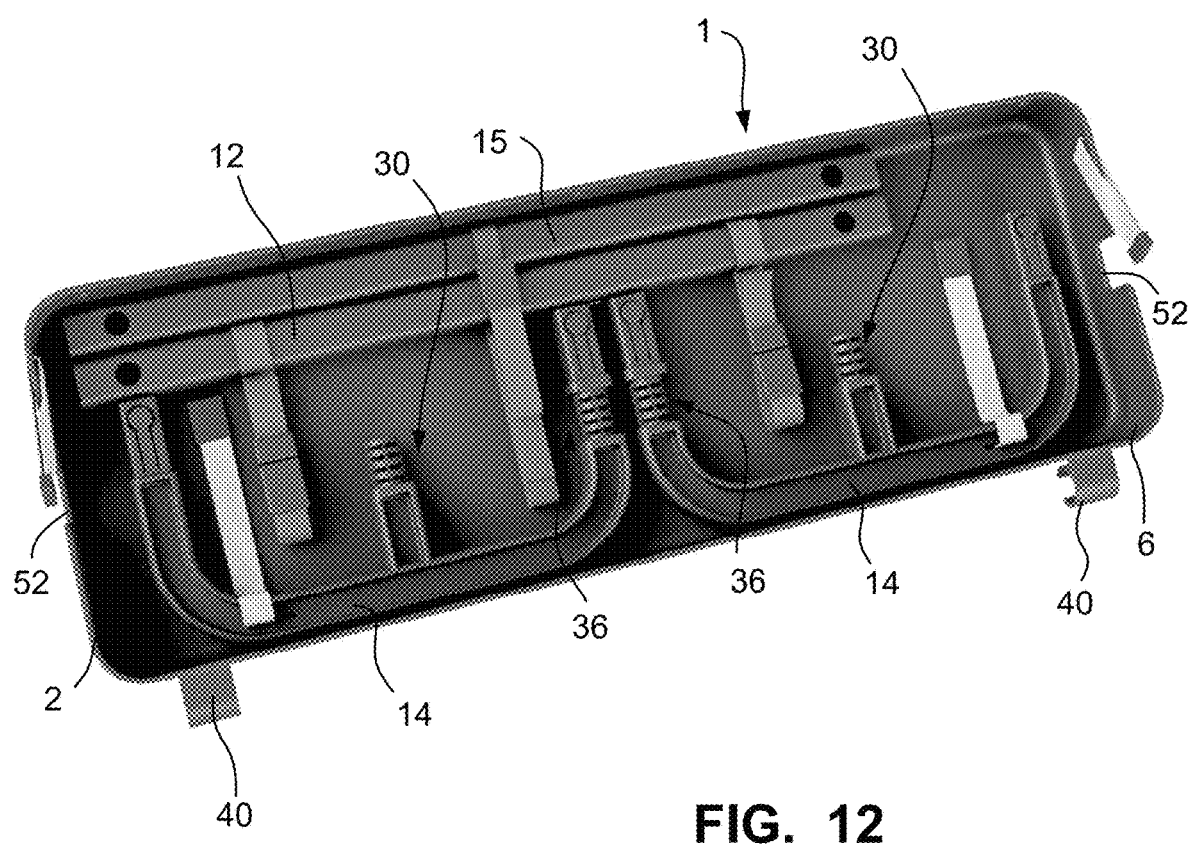
FIG. 12 is another front perspective view showing the trunk shelf system according to FIG. 1 in a storage position.

As shown in FIG. 12, the various elements of the system may be stored on the bottom surface 2 while the shelf 1 is in the storage (or shipping) position. In this position, the system 100 may be removed from the car seat back for storage. This may help to keep all of the elements together without requiring extra storage space. In this connection, it should be noted that the top and bottom bars may have an identical or substantially identical construction, and the side bars 14 may also have an identical or substantially construction. This helps with manufacture as the same mold can be used for the top and bottom bars, and the same mold can be used for the side bars. This is also helpful from the point of view of shipping, as the positions of the side bars can be interchanged relative to the shelf, and the positions of the top and bottom bars can be interchanged. Moreover, when the user wishes to store the system, the same is true.

For example, the support structure 11 may be disassembled and stored on the bottom surface 2 in the shelf 1. Each side bar 14 and bottom pin 36 may together form one piece, and the top and bottom bars 12, 15 may each form one piece. The side bar 14 and bottom pin 36 combination may include ends with smaller widths than openings on the top and bottom bars 12, 15 so that the ends may be received within the top and bottom bars 12, A mechanical lock (e.g., a spring biased pin) may be used to retain the support structure 11 in the assembled position.

In this storage position, the system 100 may take up a smaller physically footprint than in the stowed position and/or either deployed position. The storage position may be used to pack and/or ship the system 100 to a customer in order to reduce packaging size. The user may also disassemble the system 100 in to the storage position when the system 100 is not in use (e.g., being stored in their house, garage, etc.).

Different features, variations and multiple different examples have been shown and described with various details. What has been described in this application at times in terms of specific examples is done for illustrative purposes only and without the intent to limit or suggest that what has been conceived is only one particular example or specific examples. It is to be understood that this disclosure is not limited to any single specific examples or enumerated variations. Many modifications, variations and other examples will come to mind of those skilled in the art, and which are intended to be and are in fact covered by both this disclosure.

While the present technology has been described in connection with what is presently considered to be some practical and preferred examples, it is to be understood that the present technology is not to be limited to the disclosed examples, but on the contrary, is intended to cover various modifications and equivalent arrangements included within the spirit and scope of the disclosure.

The invention claimed is:

1. A trunk shelf system for mounting onto a seat back of a vehicle, the trunk shelf system comprising:
   a support structure configured to be secured to the seat back, the support structure including a first pair of connection pins and a second pair of connection pins spaced apart from the first pair of connection pins; and a shelf movably mounted to the support structure via one of the first pair of connection pins and the second pair of connection pins, the shelf having a bottom surface providing a primary support surface, wherein the shelf is movable between a stowed position and a deployed position when mounted to the support structure, and wherein the shelf includes a pair of notches or openings, and wherein the notches or openings are configured to receive the second pair of connection pins in the stowed position.

2. The trunk shelf system of claim 1, wherein the shelf is removably mounted to either the first pair of connection pins or the second pair of connection pins in the deployed position, and wherein the shelf is removably mounted to the first pair of connection pins in the stowed position.

3. The trunk shelf system of claim 1, wherein each of the pair of notches or openings is approximately centered as a cut out along a lateral side wall of the shelf.

4. The trunk shelf system of claim 1, wherein:
the support structure includes a top bar, a bottom bar, and a pair of side bars each extending between the top bar and the bottom bar, and wherein the support structure forms a closed perimeter;
the first pair of connection pins are connected to the pair of side bars between the top bar and the bottom bar;
each connection pin of the first pair of connection pins includes a fixed end connected to one side bar of the pair of side bars and a free end projecting toward the other side bar of the pair of side bars; and
the second pair of connection pins are connected between the bottom bar and one side bar of the pair of side bars.

5. The trunk shelf system of claim 1, wherein:
the first pair of connection pins and the second pair of connection pins are at least partially cylindrical; and
the shelf further comprises a first clip and a second clip, and wherein the first clip and the second clip are removably connectable to one of the first pair of connecting pins and the second pair of connecting pins.

6. The trunk shelf system of claim 1, wherein:
the support structure includes a top bar, a bottom bar, and a pair of side bars each extending between the top bar and the bottom bar, and wherein the support structure forms a closed perimeter; and
a first strap and a second strap, the first strap is connected to one side bar and an end of the shelf, the second strap is connected to the other side bar and an opposite end of the shelf.

7. The trunk shelf system of claim 1, wherein the support structure includes a top bar, a bottom bar, and a pair of side bars each extending between the top bar and the bottom bar, and wherein the support structure forms a closed perimeter.

8. The trunk shelf system of claim 7, wherein the top bar, the bottom bar, and the pair of side bars are removably connected to one another.

9. The trunk shelf system of claim 7, wherein the second pair of connection pins are connected between the bottom bar and one side bar of the pair of side bars.

10. The trunk shelf system of claim 7, wherein the first pair of connection pins and/or the second pair of connection pins are connected to the pair of side bars between the top bar and the bottom bar.

11. The trunk shelf system of claim 10, wherein each connection pin of the first pair of connection pins includes a fixed end connected to one side bar of the pair of side bars and a free end projecting toward the other side bar of the pair of side bars.

12. The trunk shelf system of claim 1, wherein the first pair of connection pins and the second pair of connection pins have substantially the same shape.

13. The trunk shelf system of claim 12, wherein the first pair of connection pins and the second pair of connection pins are at least partially cylindrical.

14. The trunk shelf system of claim 1, wherein the shelf further comprises a first clip and a second clip, and wherein are removably connectable to one of the first pair of connecting pins and the second pair of connecting pins.

15. The trunk shelf system of claim 14, wherein the shelf is pivotably mounted to the support structure.

16. The trunk shelf system of claim 1, further comprising at least one strap coupled between the support structure and the shelf, wherein the at least one strap is configured to oppose a gravitational force of the shelf.

17. The trunk shelf system of claim 16, wherein the at least one strap includes a first strap and a second strap, the first strap is connected to a first side bar and an end of the shelf, the second strap is connected to a second side bar and an opposite end of the shelf.

18. The trunk shelf system of claim 1, wherein each of the first pair of connection pins and the second pair of connection pins has a shaft and a head attached to the end of the shaft, the head being enlarged compared to the shaft.

19. The trunk shelf system of claim 18, wherein the shelf includes a pair of clips configured to be alternatively snap fit to the first pair of connection pins and the second set of connection pins.

20. The trunk shelf system of claim 18, wherein each of the clips includes a circumferential channel to receive the head and a flange positioned adjacent an inner face of the head.

21. A trunk shelf system for mounting onto a seat back of a vehicle, the trunk shelf system comprising:
a support structure configured to be secured to the seat back, the support structure including a first pair of connection pins and a second pair of connection pins spaced apart from the first pair of connection pins; and
a shelf movably mounted to the support structure via one of the first pair of connection pins and the second pair of connection pins, the shelf having a bottom surface providing a primary support surface
wherein each of the first pair of connection pins and the second pair of connection pins has a shaft, and
wherein each the shelf includes a pair of clips configured to be alternatively snap fit to the shafts of the first pair of connection pins and the shafts of the second set of connection pins.

* * * * *